(12) United States Patent
Inokuchi et al.

(10) Patent No.: US 6,325,749 B1
(45) Date of Patent: Dec. 4, 2001

(54) ROBOT VEHICLE FOR HOT-LINE JOB

(75) Inventors: Hirofumi Inokuchi; Toshihide Tomiyama; Yoshihiro Yurita; Shinji Murai; Yusuke Hirano; Shinji Harada; Kengo Tsuruta; Youichi Motomura; Kazutoshi Imai; Yoshiaki Haga; Yoshikatsu Nakamura; Yukio Hashiguchi; Mitsuhiro Matsuzaki; Hiromichi Yamada; Akihiko Mishima; Yoshinaga Maruyama; Kyoji Yano; Moriyuki Nakashima; Osamu Yamashita, all of Fukuoka (JP)

(73) Assignees: Kabushiki Kaisha Yaskawa Denki; Kyushu Electric Power Co., Ltd., both of Fukuoka (JP)

( * ) Notice: Subject to any disclaimer, the term of this patent is extended or adjusted under 35 U.S.C. 154(b) by 0 days.

(21) Appl. No.: 09/284,674

(22) PCT Filed: Oct. 16, 1997

(86) PCT No.: PCT/JP97/03734

§ 371 Date: Sep. 22, 1999

§ 102(e) Date: Sep. 22, 1999

(87) PCT Pub. No.: WO98/17577

PCT Pub. Date: Apr. 30, 1998

(30) Foreign Application Priority Data

Oct. 18, 1996 (JP) .................................................... 8-276671

(51) Int. Cl.⁷ .............................. B23Q 3/155; B25J 3/00; B66C 23/00; B66F 11/00
(52) U.S. Cl. ........................... 483/13; 182/2.11; 212/284; 212/332; 414/728; 901/1; 901/8
(58) Field of Search .................................... 483/1, 54, 55, 483/901, 902, 14, 13; 901/1, 8; 182/2, 11, 287, 285, 288, 290; 212/284, 331, 332, 232; 248/49; 414/728; 318/34

(56) References Cited

U.S. PATENT DOCUMENTS

| 4,508,014 | * | 4/1985 | Shoff ...................................... 212/160 |
| 4,917,213 | * | 4/1990 | Kessler ....................................... 182/2 |
| 5,107,954 | * | 4/1992 | Mineyuki .............................. 182/2.11 |
| 5,183,168 | * | 2/1993 | Fujimoto .............................. 212/232 |
| 5,200,674 | * | 4/1993 | Fujimoto et al. ....................... 318/34 |
| 5,215,202 | * | 6/1993 | Fujimoto .............................. 212/232 |
| 5,286,159 | * | 2/1994 | Honma .................................. 414/728 |
| 5,538,207 | * | 7/1996 | O'Connell et al. .................. 182/2.11 |

FOREIGN PATENT DOCUMENTS

| 64-43010 | * | 2/1989 | (JP) ...................................... 212/331 |
| 1-285597 | * | 11/1989 | (JP) ...................................... 212/332 |

* cited by examiner

Primary Examiner—William Briggs
(74) Attorney, Agent, or Firm—Jordan and Hamburg LLP

(57) ABSTRACT

A robot vehicle for hot-line job for transmission and distribution lines which comprises an insulating boom formed of an insulating material at a tip end stage of multiple stage booms, a base end of which is supported on an elevated work vehicle to be capable of swinging, pivoting up and down, and extending and contracting, and a frame provided on the tip end of the insulating boom, the frame mounting thereon double arm manipulators of multishaft construction for performing a distribution work, a slide device for sliding independently these right and left double arm manipulators front to rear, and lifting arms of multishaft construction having a function of lifting a heavy article, so as to allow an operator to perform remote control. An electric actuator is used for driving the double arm manipulators and the slide device, and hydraulic manipulators for driving the lifting arms. Accordingly, a robot vehicle for hot-line job is provided to mount thereon a third arm which enables highly accurate positioning of the manipulators, remote control by an operator and automatic operation through a teaching-playback, has a function of lifting a heavy article, and is small-sized and lightweight.

12 Claims, 29 Drawing Sheets

PUSH CYLINDER OUT

PUSH JOINT IN

JOINT IS RETURNED
(ATTACH SOCKET)

CYLINDER IS RETURNED
(SOCKET IS REMOVED)

PUSH JOINT IN

PUSH CYLINDER OUT

CYLINDER IS RETURNED
(SOCKET IS RETRACTED)

JOINT IS RETURNED
(SOCKET IS CONTAINED)

ROBOT VEHICLE FOR HOT-LINE JOB

TECHNICAL FIELD

The present invention relates to a robot vehicle for hot-line job used in outage-free maintenance techniques carried out without interrupting the supply of electric power during wiring work and maintenance on high voltage transmission and distribution lines.

BACKGROUND ART

A robot vehicle for hot-line job is a vehicle for high-place work having two-armed manipulators for operations and a third arm for suspending heavy matters to be supported on an electrical wire, on a manipulator base mounted on the end of a boom thereof, and wiring work and maintenance are carried out by operating them from an operation cabin on the ground in a robot vehicle or from an operation panel on a bucket provided at the end of the boom.

When all of actuators for driving the two-armed manipulators and third arm are constituted by hydraulic actuators, high positioning accuracy can not be achieved for the two-armed manipulators and, as a result, it becomes difficult to conduct teaching-playback and automatic operations based on a correcting function associated therewith. However, this makes it possible to reduce the size and weight of the third arm which has the function of suspending heavy matters and which is not required to be so high in positioning accuracy. Conversely, when all of the driving mechanisms for the two-armed manipulators and third arm are constituted by electrical actuators, high accuracy is achieved by the two-armed manipulators to facilitate corrective automatic operations such as approaching an object to be worked, whereas the third arm becomes large and heavyweight.

Under such circumstances, there is a need for a robot vehicle for hot-line job in which highly accurate positioning of a manipulator can be achieved to enable remote operations by an operator and corrective automatic operations such as approaching an object to be worked and which is loaded with a compact and lightweight third arm having a function of suspending heavy matters.

In a robot for working on hot lines, a robot which an operator boards on a bucket at the end of a vehicle for high-place work and he operates a manipulator therein, is called "an on-board type robot for working on hot lines". One possible pattern of the occurrence of an electric shock of an operator of a man-operated robot for working on hot lines is as shown in FIG. 7 in which an operator 56 touches a hot line 61 in a bucket 55. In this case, a voltage between the hot line 61 and the ground causes a current to flow through a path extending from the hot line 61 through the operator 56, the bucket 55, a boom portion (a third boom 54, a second boom 53 and a first boom 52), a vehicle 51 and to the ground. In FIG. 7, 57 designates an operation panel; 58 designates a manipulator mounting portion; 59 designates a first insulated arm portion; and 60 designates a second insulated arm portion.

For the safety of operators, safety standards for vehicles for high-place work are defined by Japan Vehicle Body Industries Association. It is specified by the standards that a leakage current should not exceed 0.5 mA as the insulating performance of a vehicle for high-place work. Further, it is specified that a voltage equivalent to twice a line voltage must be applied as a test voltage according to the standard because a leakage current varies depending on the applied voltage. A robot for working on hot lines according to the present invention is aimed at operations on hot lines at 23 kV. Therefore, referring to the electric shock shown in FIG. 7 at a man-operated robot for working on hot lines, the leakage current that flows through the operator must be 0.5 mA or less when a voltage of 46 kV is applied. For this purpose, as shown in FIG. 8, hitherto the insulation characteristics have been ensured by forming the end of the third boom 54 with an FRP hollow cylinder 62 which is an insulating material.

However, in order to keep the leakage current at 0.5 mA or less in rainy weather with the above-described configuration, the creepage distance of insulation must be long, and this has resulted in a need for always keeping the third boom in an extended state in which it spans 2 meters or more. Therefore, in rainy weather, the third boom 54 must be extended to a span of 2 meters or more even when the hot line to be worked is in a relatively low position. In this case, the weight of the manipulator portion can reduce the balance of the vehicle body to support the same and can cause the vehicle body to fall down, which makes an operation difficult or impossible. Even if an operation can be carried out with the third boom extended to a span of 2 meters or more, continued rain fall on the third boom reduces the property of shedding water of the surface of the third boom, i.e., water repellency, to make it impossible to keep the leakage current at 0.5 mA or less. When rain falls on the surface of the third boom with a voltage applied thereto, discharge occurs on the boom surface to deteriorate the FRP resin layer on surface of the third boom rapidly, thereby reducing water repellency rapidly. This makes it impossible to keep the leakage voltage at 0.5 mA or less.

When foreign substances such as sand stick to the third boom, the third boom is damaged in the area of a rotor which receives the third boom 54 during the extension and retraction of the boom, which results in a reduction of the water repellency of the third boom in a long term.

FIG. 8 is a sectional view of a structure of a conventional boom portion. In FIG. 8, a third boom 54 is an insulator which supports a manipulator portion and which is constituted by an FRP hollow cylinder 62. Since the FRP hollow cylinder 62 is an insulator, even if an operator 56 touches a hot line in a state as shown in FIG. 7 in sunny weather, the leakage current can be kept at 0.5 mA or less for a voltage of 46 kV at the hot line if the third boom 54 is extended to a span of 0.5 meters.

With the conventional structure shown in FIG. 8, however, a test on it resulted in a rapid increase of the leakage current from the third boom 54 when the surface of the third boom 54 was exposed to dirty water with a voltage applied the third boom 54. Therefore, the third boom 54 with such a structure has a leakage current of 0.5 mA or more in rainy weather, and an operator of the robot for working hot lines may have an electric shock when he or she touches the hot line.

In the case of a distribution line voltage in a 6 kV class, it is possible to maintain a level of insulation to withstand a breakdown voltage which is required to prevent phase shorting accidents by covering exposed metal regions of the manipulator and the actuator with an insulating protective cover. In the case of a voltage in a 22 kV class, a large insulation distance must be kept between the insulating protective cover and the metal regions to withstand a breakdown voltage, which has resulted in a problem in that no manipulator can be provided for practical use.

When an electrical actuator is used as the manipulator of a robot vehicle for hot-line job used in outage-free maintenance techniques for the maintenance of distribution of electricity, in order to prevent an accidental electrical shock to a human being, the end of the boom is constituted by an insulator; a generator for driving the manipulator and the like is mounted on a mount base; and electrical insulation is maintained between the vehicle and the mount base. Further, an insulated portion is provided on a forearm of a manipulator to prevent a ground fault caused by a manipulator and a phase shorting accident which occurs when tools mounted at the ends of two manipulators or the ends of the manipulators touch hot lines in different phases simultaneously during an operation.

Although an accidental electrical shock to a human being can be prevented by the prior art, there has been a problem in that it is not possible to prevent a phase shorting accident which occurs when the elbows of two manipulators or the elbow and the upper arm thereof or the upper arms thereof simultaneously touch hot lines in different phases as a result of malfunction of the manipulators and the booms themselves or an erroneous operation by the operator because the electrical actuators provided at the elbows and upper arms of the two manipulators are electrically connected through an robot controller.

Further, in the case of a robot vehicle for hot-line job which deals with high voltages, in order to improve safety by preventing a physical injury of an operator caused by an electric shock and damage to electronic devices caused by a short and ground fault, earthing is carried out through a grounding operation to connect the main bodies of the electronic devices and a ground wire electrically, and this results in a need for earthing at each movement to a site of operation. This operation is carried out by an operator, and only a visual determination is made on the physical state of grounding. Under such circumstances, it is desired to allow real time unattended determination of a state of electrical grounding in order to prevent an operator from failing to carry out earthing.

In addition, slide shafts which provided on a two-armed robot have moved back and forth relative to an object to be worked during an operation of each robot or have slid back and forth simultaneously at both arms in order to allow them approach the object to be worked. In the prior art, however, since the slides moves only in parallel with each other with the distance between the two robots fixed, it has been difficult work on an object interposed between the robots because of such a configuration.

When the robots are mounted at an increased interval to solve this, a problem arises in that the robots will occupy a larger space and become heavier. In order to allow the mounting interval of the robots to be decreased while they are idle and to allow the interval to be increased to put an object to be worked therebetween during an operation, another shaft must be added, and the addition of a shaft is problematic from the viewpoint of weight, space, cost etc.

DISCLOSURE OF THE INVENTION

It is a first object of the invention to provide a robot vehicle for hot-line job comprising a compact and lightweight third arm in which a manipulator can be positioned with high accuracy, which allows a remote operation by an operator and an automatic operation based on teaching, playback and a correcting function associated therewith and which has a function of suspending a heavy object to be supported on an electric wire.

It is a second object of the invention to provide a structure of a boom of a vehicle for high-place work for wiring whose water repellency can be maintained for a long period of time and which has no risk of an electric shock in a state wherein the boom is extended even during an operation of a robot for working on hot lines in rainy weather.

It is a third object of the invention to prevent phase shorting accidents of a manipulator that occur when two manipulator simultaneously touch hot lines in different phases due to malfunction and an erroneous operation.

It is a fourth object of the present invention to improve safety by disabling electronic devices when no earthing is provided.

It is a fifth object of the present invention to provide a slide shaft configuration in which only one slide shaft is used which can be retracted in a compact size and which can be operated depending on the work carried out to interpose an object to be worked in the gap of two-armed manipulators.

It is a sixth object of the invention to provide an apparatus for automatically changing tools required for the operation of two-armed manipulators.

It is a seventh object of the invention to provide a tool supplying device capable of picking up tools used in the operation of two-armed manipulators efficiently.

It is an eighth object of the invention to provide a socket changing device used for the attachment and removal of nuts performed by two-armed manipulators.

It is a ninth object of the invention to provide a method of control for a robot vehicle for hot-line job including a base having a slide mechanism on which a manipulator is mounted wherein the position of a slide shaft can be determined by the position and orientation of the finger tip thereof given as target values and wherein slide shafts and the manipulator can be controlled simultaneously.

It is a tenth object of the invention to output operation instructions without manual adjustment operations to align the position and orientation of one arm of a two-armed manipulator with those of the other automatically, thereby reducing the operating time and operability.

It is an eleventh object of the invention to provide a method of performing accurate calibration to determine a basic posture of a robot for which absolute accuracy is required, wherein accurate calibration can be carried out in a short period of time without repeating calibration from the basic posture when the calibration is required as a result of a positional shift or replacement of components.

In order to achieve the first object, according to the present invention, there is provided a robot vehicle for working on live transmission and distribution wires comprising an insulated boom constituted by an insulator which is the end stage of a multi-stage boom rotatably, elevatably and extendably supported on a vehicle for high-place work at the base thereof, two-armed manipulators in a multi-shaft configuration for wiring operations, sliding devices for sliding those left and right two-armed manipulators independently, a suspender arm in a multi-shaft configuration having a function of suspending a heavy object to be supported on an electric wire to allow remote operations by an operator, wherein actuators for driving said two-armed manipulators and said sliding devices are configured on an electrical basis and said manipulator for driving the suspender arm on a hydraulic basis.

In order to achieve the second object, according to the present invention, there is provided a robot vehicle for hot-line job as described above, wherein an umbrella having a gutter to collect rain is mounted on the end of said insulated boom.

Further, said boom has a structure consisting of an extending boom made of FRP or GFRP having a working portion for performing wiring work mounted on the end thereof and a container boom having a roller for guiding and supporting said extending boom, and a silicon compound is applied to a sliding surface of said extending boom.

Alternatively, said boom has a structure consisting of an extending boom made of FRP or GFRP having a working portion for performing wiring work provided on the end thereof and a container boom having a roller for guiding and supporting said extending boom, and an umbrella formed of an insulator and applied with a silicon compound on the surface thereof is provided at a non-sliding portion of said extending boom in no contact with the roller.

In order to achieve the third object, there is provided a robot vehicle for hot-line job as described above, comprising robot controllers for controlling said two two-armed manipulators and generators for supplying power to the robot controllers each provided independently to prevent phase shorting accidents which occur when the two electrical two-armed manipulators in a multi-shaft configuration touch hot lines in different phases simultaneously, wherein the robot controllers and said generators are secured to said base constituted by an insulator and signals are transmitted and received between the two separate robot controllers using an optical cable to provide electrical insulation between the two manipulators.

In order to achieve the fourth object, there is provided a robot vehicle for hot-line job as described above, comprising an earth interlock device which has two conductors provided with connection fittings connectable and securable to a grounding wire on the end thereof and insulated from each other, one or two probes for containing said two conductors having a structure in which said two connecting fittings are insulated from each other, a coil magnetized when said two connecting fittings are connected to the grounding wire, an electromagnetic contactor having a contact capable of enabling operational circuits of electronic devices when said coil is magnetized and a battery for supplying power to said electromagnetic contactor and in which said connection fittings, electromagnetic contactor and battery are connected in series to one of said conductor.

In order to achieve the fifth object, there is provided a robot vehicle for hot-line job as described above, wherein said two sliding devices are mounted in an arrangement such that the interval from each other is increased expanded toward the end.

In order to achieve the sixth object, there is provided a robot vehicle for hot-line job as described above, comprising an automatic tool changer for automatically changing tools required for the operation of said two-armed manipulators provided on said base, wherein the automatic tool changer comprises:

a tool attaching and detaching portion having a key for positioning a tool in a key groove on a manipulator and a clamp button for securing a tool operable in a radial direction and having a restoring force in the direction of moving away from a center axis;

a rack portion having a cylinder for pressing said clamp button when a tool is attached and detached; and a pneumatic pressure circuit capable of varying the thrust force of said cylinder.

In order to achieve the seventh object, there is provided a robot vehicle for hot-line job as described above, wherein said base comprises a work tool supplying device comprising:

a stand for positioning and holding each work tool;

an intermediate base on which said stand is disposed as required in advance depending on the work;

a general-purpose base common to all kinds of work on and from which a plurality of intermediate bases can be positioned and removed at equal angles or equal intervals: and a driving portion to and from which both of said intermediate base and general-purpose base can be attached and detached for driving said general-purpose base for angular indexing.

In order to achieve the eighth object, there is provided a robot vehicle for hot-line job as described above, comprising a socket changing device which is a tool for fastening and loosening of a bolt or the like performed by said two-armed manipulators, for pushing a predefined part of a attaching/detaching portion when the tool and a socket are attached together or detached in an axial direction to allow the robot to replace a socket attachable to and detachable from the main body of the tool automatically, wherein the socket changing device comprises:

a cylindrical base for pushing said attaching/detaching portion;

a nut engaging with a polygonal hole of said socket; and a shaft into which the nut is screwed and which is supported in the base with a spring to be slidable in an axial direction.

In order to achieve the eighth object, there is provided a robot vehicle for hot-line job as described above, comprising a socket changing device which is a tool for fastening and loosening of a bolt or the like performed by said two-armed manipulators, for pushing a predefined part of a attaching/detaching portion when the tool and a socket are attached together or detached in an axial direction to allow the robot to change a socket attachable to and detachable from the main body of the tool automatically, wherein the socket changing device comprises:

a base for urging the attaching/detaching portion at the end of the tool;

a nut having a configuration to engage with a polygonal hole of said socket;

a shaft engaged with the nut so as to allow the same to rotate; and a cylinder coupled to said shaft to force said nut and shaft to move to a predefined attaching/detaching position.

In order to achieve the ninth object, there is provided a method for controlling a robot vehicle for hot-line job comprising a manipulator including articulated manipulators, a base having slide mechanisms on which said articulated manipulators are mounted and a controller for controlling said articulated manipulators and slide mechanisms, wherein:

to decide the angle of each articulation of said multi-joint manipulators and the position of the base having the slide mechanisms when the position and orientation of the fingertips are given as target values, the position and orientation of said fingertips are given as target values to decide the angle of each articulation of said articulated manipulators and the position of the base having the slide mechanisms by adding the distance between the origins of said articulated manipulators and points at which the positions of the articulated manipulators are decided to control conditions for course calculations to decide the position of the base having the slide mechanisms, thereby controlling the courses of the base having the slide mechanisms and articulated manipulators simultaneously.

In order to achieve the tenth object, the position and orientation of one arm of a two-armed robot are aligned in a desired relationship with the position and orientation of the other arm by reading the position data and orientation data for the arm to be controlled and the arm to serve as a reference and by carrying out a comparison operation to supply an operation command to said arm to be controlled.

In order to achieve the eleventh object, the posture of a robot is calibrated by storing a output value of a position detector of a motor representing the distance from a basic posture determined as a result of accurate calibration to a position where a stopper provided in the operating region of each shaft is hit and by using a position reached by returning from said position where the stopper is hit by said stored output value as basic posture when the posture of the robot must be calibrated.

BEST MODE FOR CARRYING OUT THE INVENTION

Embodiments of the present invention will now be described.

Figure 1:
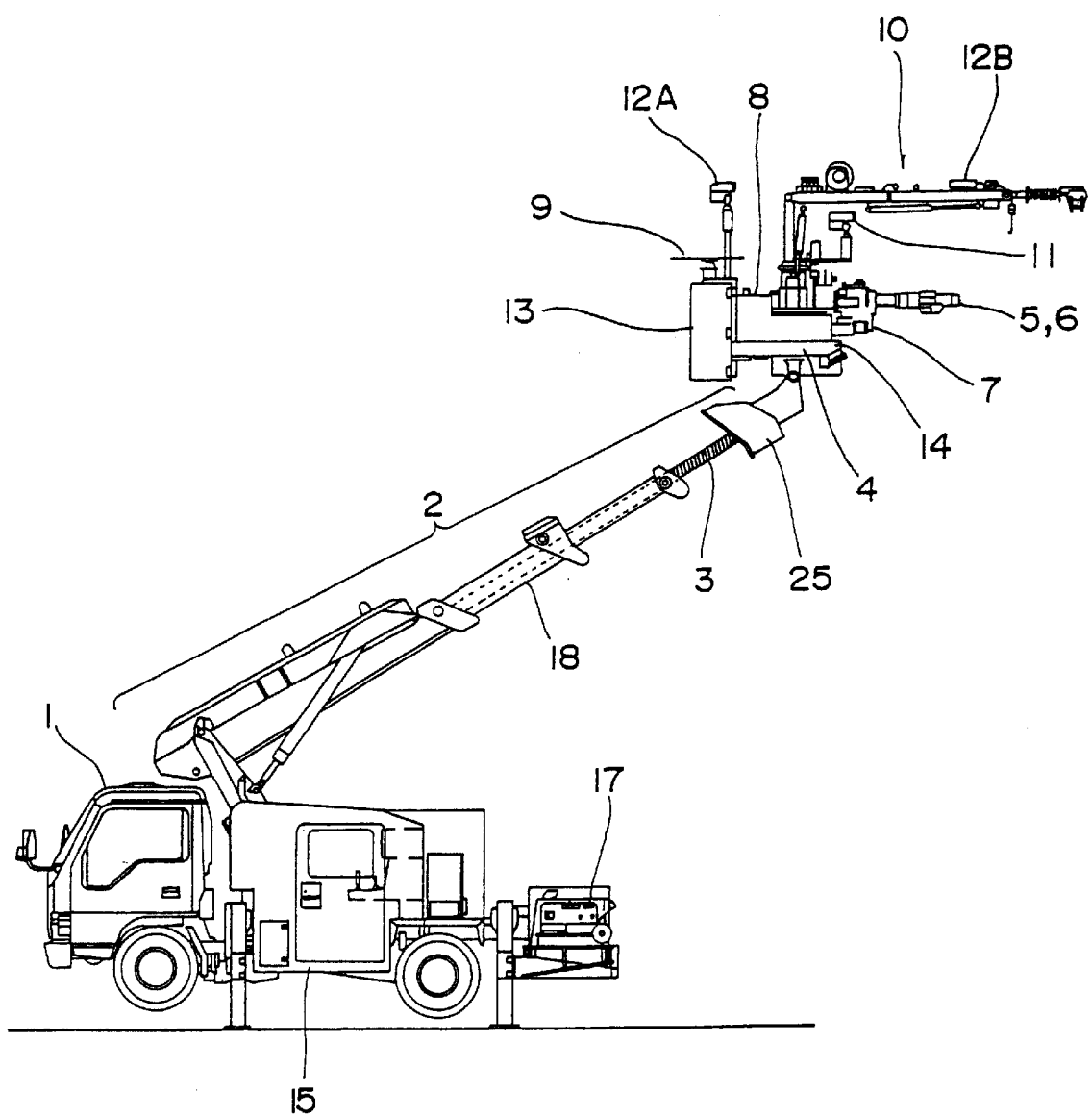
FIG. 1 is a general configuration diagram of a first embodiment of the present invention.

FIG. 1 is a general configuration diagram of a first embodiment. Referring to FIG. 1, the end stage of a multi-stage boom 2 of a vehicle 1 for high-place work having pivotting, elevating and extending functions is an insulated boom 3 constituted by an insulator. Two-armed manipulators 5, 6 in a seven-shaft configuration having an extra shaft power for distribution work a sliding device 7 for sliding the left and right two-armed manipulators 5, 6 back and forth independently, an arm 10 in a three-shaft configuration having a function of suspending heavy objects and pivoting and elevating functions, an automatic tool changer (ATC) 8 for automatically changing tools required for the operation of the two-armed manipulators 5, 6, an automatic material exchanger (AMC) 9 capable of automatically picking up and returning materials required for the operation of the manipulators 5, 6, a three-dimensional distance measuring device 11 for measuring the distance of an object to be worked, a plurality of cameras 12A, 12B for photographing states of operation, a robot controller 13 for controlling the two-armed manipulators 5, 6, sliding device 7, ATC 8, AMC 9, arm 10, three-dimensional distance measuring device 11 and cameras 12A, 12B and a hydraulic actuator driving generator 14 for supplying power to the robot controller 13 are carried by a base 4 provided at the end of the insulated boom 3.

Figure 2A:
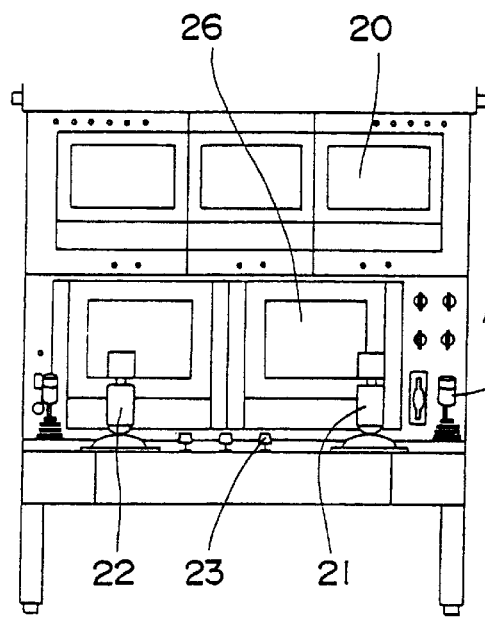
FIG. 2 shows an arrangement of an operation panel and a monitor wherein (*a*) represents a front view; (*b*) represents a side view; and (*c*) represents a plan view.
Figure 2B:
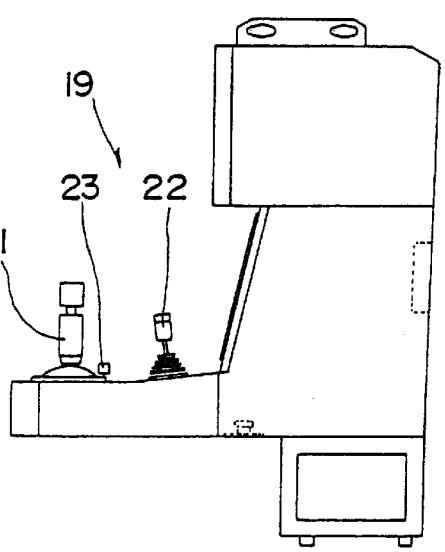
Figure 2C:
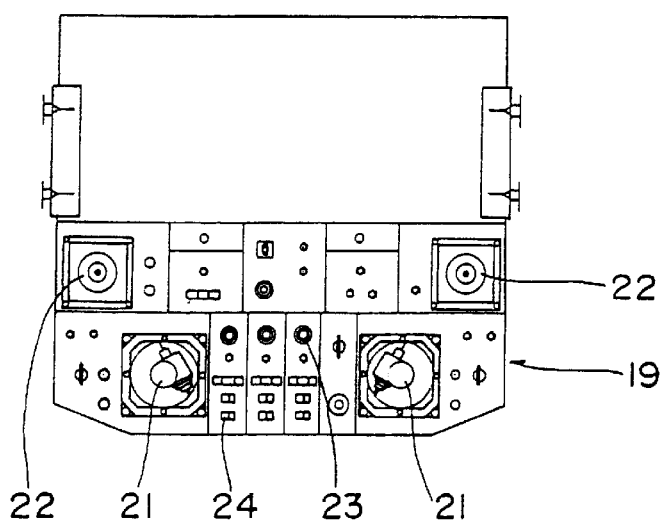

In a vehicle portion 15 of the vehicle 1 for high-place work, there is provided a hydraulic driving source 17 for supplying oil to hydraulic actuators which drive the devices provided on the base 4 through a hydraulic hose provided in the boom 2. In the vehicle portion 15, there is provided a monitor (CRT monitor device) 20 for displaying images transmitted from the cameras 12 through an optical cable 18 provided in the boom 2 and an operation panel 19 for transmitting operation signals to the robot controller 13 through the optical cable 18 provided in the boom 2. As shown in FIG. 2((*a*) represents a front view; (*b*) represents a side view; and (*c*) represents a plan view), an operator performs remote operations of the devices 5, 6, 8, 9, 10, 11, 12 provided on the base 4 by operating joysticks 21, 22, 23, an operation button 24 or a touch panel 26 provided on the operation panel 19 while watching the monitor 20 to work on a hot line.

Figure 3A:
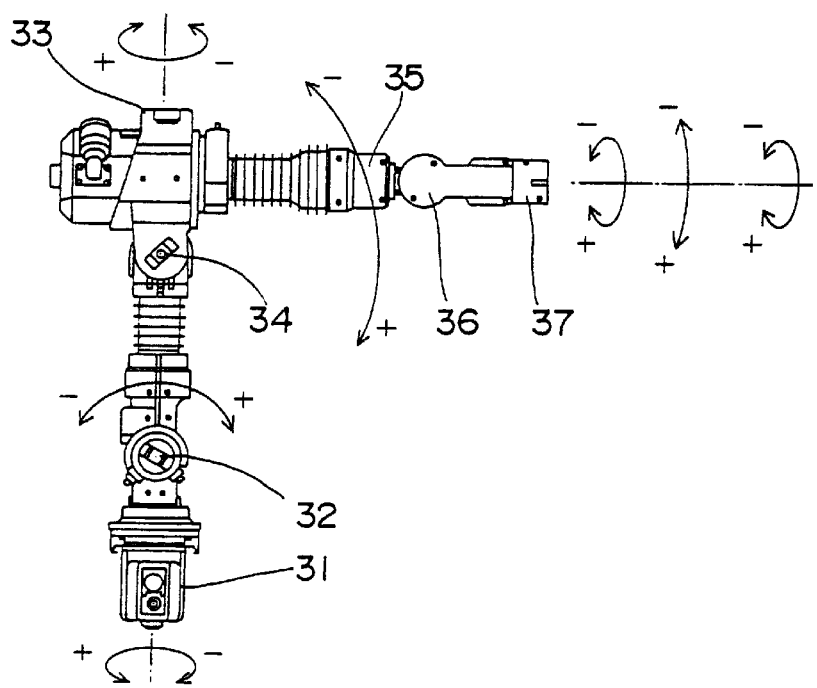
FIG. 3 shows an example of a manipulator wherein (*a*) represents a side view; (*b*) represents a plan view; and (*c*) represents a front view.
Figure 3C:
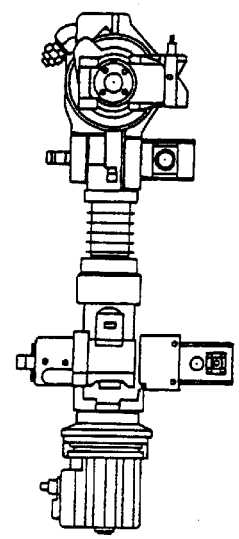
Figure 3B:
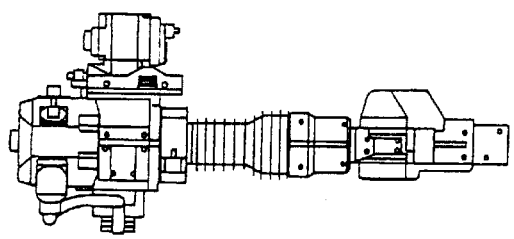

FIG. 3 illustrates the two-armed manipulators 5, 6, (*a*) represents a front view; (*b*) represents a side view; and (*c*) represents a front view. In the figure, 31 represents a pivot; 32 represents a shoulder bending shaft; 33 represents an elbow rotating shaft; 34 represents an elbow bending shaft; 35 represents a wrist rotating shaft; 36 represents a wrist bending shaft; and 37 represents a flange rotating shaft.

Figure 4:
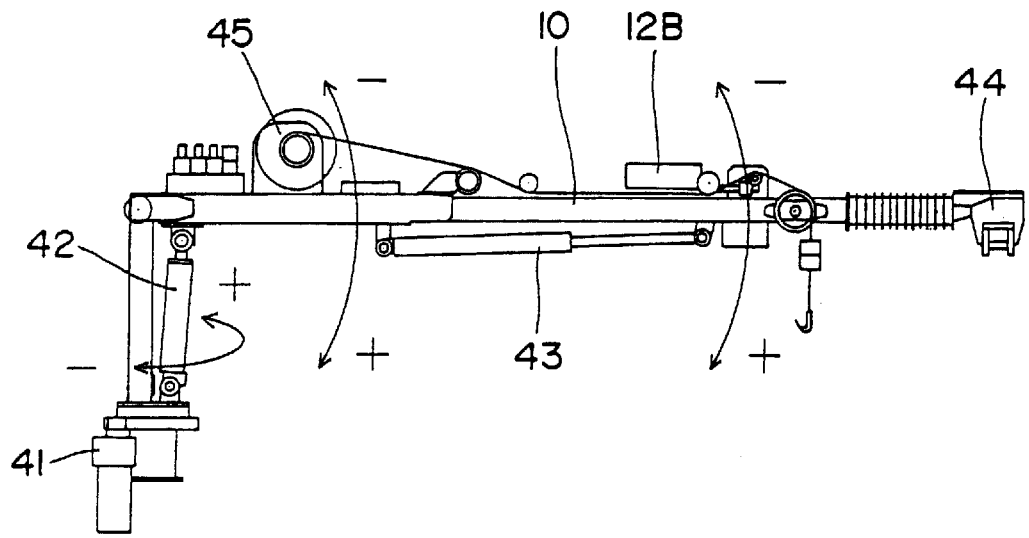
FIG. 4 is a side view of an example of a third arm.

FIG. 4 is a side view of the arm 10 in which 41 represents a pivot; 42 represents an elevating shaft; 43 represents an elevating shaft; 44 represents a four-side roller; and 45 represents a winch.

Figure 5:
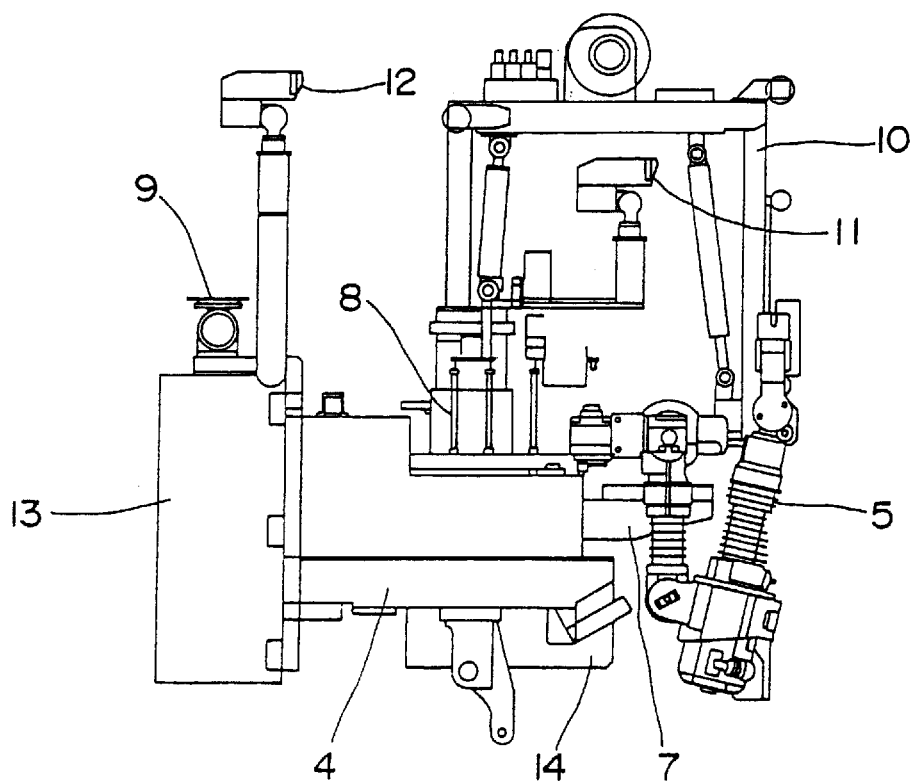
FIG. 5 is a side view of the third arm showing a retracted posture thereof.

FIG. 5 is a side view showing the third arm in a retracted state.

In the present embodiment, actuators for driving the two-armed manipulators 5, 6 and the sliding device 7 therefor are configured on an electrical basis, and manipulators for driving the arm 10 are constituted by hydraulic actuators. Alternatively, an actuator for driving the pivot of the arm 10 may be configured on an electrical basis, and actuators for driving other shafts may be configured on a hydraulic basis. With such a configuration, the positioning accuracy of the two-armed manipulators is improved and the arms are made compact and lightweight.

An umbrella 25 having a gutter is mounted on the end of the insulated boom 3 to reduce rain fall on the insulated boom 3 in rainy weather, thereby improving the insulating characteristics of the boom.

1) The first embodiment is characterized as follows. It has a remote operation function with which an operator on the ground operates the manipulators while watching the monitor and an automatic operation function based on teaching, playback and a correction function associated therewith.

When hydraulic manipulators are used, it is difficult to perform an automatic operation based on teaching and playback because the manipulators have low repetitive positioning accuracy. Therefore, electrical manipulators having high positioning accuracy are used to enable an automatic operation based on teaching and playback.

2) A hybrid configuration is employed in which manipulators to perform delicate operations are configured with electrical actuators and in which an arm (third arm 10) to perform somewhat rough operations such as suspending a heavy object is configured with a hydraulic actuator.

3) A method has been developed to improve operability which allows optimum control over an 8-shaft manipulator which is a combination of a 7-shaft manipulator having an extra shaft and a sliding device (1-shaft) for sliding the manipulator back and forth.

4) An umbrella having a gutter is mounted on the end of an insulated boom to improve the insulation characteristics of the boom when exposed to water.

Next, a method for using a robot vehicle for hot-line job according to the present invention will be described with reference to an operation of mounting a protective pipe for construction as an example.

A. Operation of Mounting a Protective Pipe for Construction

1. Preparation of the Operation

First, a supplied tool securing portion is gripped by and set in the four-side roller 44 of the third arm 10. The angle of the supplied tools is vertically and horizontally adjusted to put it in a predetermined position. An inserting machine and a gripper are set at the left manipulator 5 and the right manipulator 6, respectively. At this time, a mounting guide and an attachment for transferring a tool shaft are attached to the inserting machine, and a finger for poly pipe is attached to the gripper. The third arm 10 is moved to a supplied tool suspending position.

2. Elevating the Boom

An electric wire to be mounted is elevated by a manual operation until it centered in a main camera. The boom 2 is moved to a work starting position.

3. Suspending the Winch

The winch 45 of the third arm 10 is suspended by a manual operation. A supplied tool suspending portion is suspended at about 1.5 m, and a protective pipe for construction is set on the ground.

4. Attaching the Inserting Machines

The electric wire is gripped by the right gripper. The inserting machine of the left manipulator 5 is caused to approach the electric wire. The fastening portion is gripped by the right gripper. The right gripper is rotated in the reverse direction to attach the inserting machine.

5. Suspending the Supplied Tools

The supplied tool suspending portion is lifted up to the securing portion.

6. Attaching Protective Pipes for Construction (1) Attaching a First Pipe

The protective pipe for construction is picked up by the right gripper from among the supplied tools. The protective pipe for construction is caused to approach the inserting machine. The protective pipe for construction is urged until it reaches the tire of the inserting machine. The protective pipe for construction is fed to an intermediate position of a split guide.

(2) Attaching 2 Two through Fourth Pipes

The protective pipes for construction are picked up by the right gripper from among the supplied tools. The protective pipes for construction are caused to approach the inserting machine. The protective pipes for construction are urged until they are combined with the preceding pipes. The protective pipes for construction are fed to an intermediate position of a split guide.

(3) Moving the Third Arm

The third arm 10 is moved to a position where fifth through eighth protective pipes for construction are picked up.

(4) Fifth through Seventh Pipes

The protective pipes for construction are picked up by the right gripper from among the supplied tools. The protective pipes for construction are caused to approach the inserting machine. The protective pipes for construction are urged until they are combined with the preceding pipes. The protective pipes for construction are fed to an intermediate position of a split guide.

(5) Attaching the Last Pipe

The protective pipe for construction is picked up by the right gripper from among the supplied tools. The protective pipe for construction is caused to approach the inserting machine. The protective pipe for construction is urged until they are combined with the preceding pipe. The protective pipe for construction is fed until it passes tires of the inserting machines.

7. Final Pipe Feeding

A feed pipe is picked up by the right gripper. The feed pipe is caused to approach the inserting machine. The feed pipe is pushed up to the tire of the inserting machine. It is fed until the electric wire is inserted into the end of the last pipe and then returned to the tire. The feed pipe is withdrawn from the inserting machine. The feed pipe is recovered in a recovery bag.

8. Removing the Inserting Machine

The fastening portion is gripped by the right gripper. The right gripper is rotated in the normal direction to loosen the inserting machine away from the electric wire. The electric wire is gripped by the right gripper. The inserting machine is removed from the electric wire. The right gripper is retracted from the electric wire.

9. Attaching Protective Pipe Stopper

The boom 2 is moved an attaching position. A protective pipe stopper is picked up by the right gripper. The tube stopper is attached.

10. Moving the Boom

The boom is moved to the next electric wire.

11. Lowering the Boom

The boom is moved down to the ground.

B. Operation of Removing the Protective Pipes for Construction

1. Preparation of the Operation

The grippers are set in the left and right manipulators, and the inserting machine is gripped by the left manipulator. The third arm 10 is moved to a poly tube collection bag suspending position.

2. Elevating the Boom

It is elevated through a manual operation until the poly tube stopper of an electric wire to be removed is centered in the main camera. The main camera is moved to a work starting position, and the boom 2 is moved to the work starting position.

3. Attaching the Inserting Machine

The electric wire is gripped by the right gripper. The inserting machine of the left manipulator 5 is caused to approach the electric wire. The fastening portion is gripped by the right gripper. The right gripper is rotated in the reverse direction to fasten the inserting machine to the electric wire. The left gripper is removed from the gripping portion and retracted.

4. Collecting the Poly Tube Stopper

The poly tube stopper is removed by the left gripper. The poly tube stopper is collected into a collection bag.

5. Removing Protective Pipes for Construction (1) Preparation for the Removal of the Poly Tubes The first pipe to be removed is inverted and gripped.

The first pipe to be removed is returned to the tire of the inserting machine. The left gripper is retracted. The left gripper grips an inserting machine rotating operation portion. The right gripper is removed from the inserting machine fastening portion and is moved to a removed pipe gripping position.

(2) Suspending the Collection Bag for The Protective Pipes for Construction

The winch of the third arm is suspended, and the collection bag for the protective pipes for construction is suspended and set.

(3) Removing the First Pipe

The rotating operation portion is operated by the left gripper to return the first pipe until the portion thereof connected to the second pipe reaches the end of the split guide. The first pipe is gripped by the right gripper, and the portion connected to the second pipe is disconnected. The first pipe is collected into the collection bag. The right gripper is moved to a position to grip the second and later pipes to be removed.

(2) Removing the Second and Later Pipes

The rotating operation portion is operated by the left gripper to return the pipe until the connecting portion reaches the end of the split guide. The second pipe is gripped by the right gripper, and the connecting portion is disconnected. The removed pipe is collected into the collection bag. The right gripper is moved to a position to grip the next pipe to be removed.

(3) Removing the Last Pipe

The rotating operation portion is operated by the left gripper to return the last pipe until the end thereof reaches the tire. The pipe to be removed is gripped by the right gripper and is pulled out from the inserting machine. The last pipe is collected in the collection bag.

6. Suspending and Lowering the Collection Bag

The collection bag for the protective pipes for construction is suspended and lowered to the ground.

7. Removing the Inserting Machine

The fastening portion is gripped by the right gripper. The left gripper is removed from the rotating operation portion to grip the gripping portion. The right gripper is rotated in the normal direction to loosen the inserting machine away from the electric wire. The electric wire is gripped by the right gripper. The inserting machine is removed from the electric wire. The right gripper is retracted from the electric wire.

8. Moving the Boom

The boom is moved to the next electric wire.

9. Lowering the Boom

The boom is lowered down to the ground.

Figure 6:
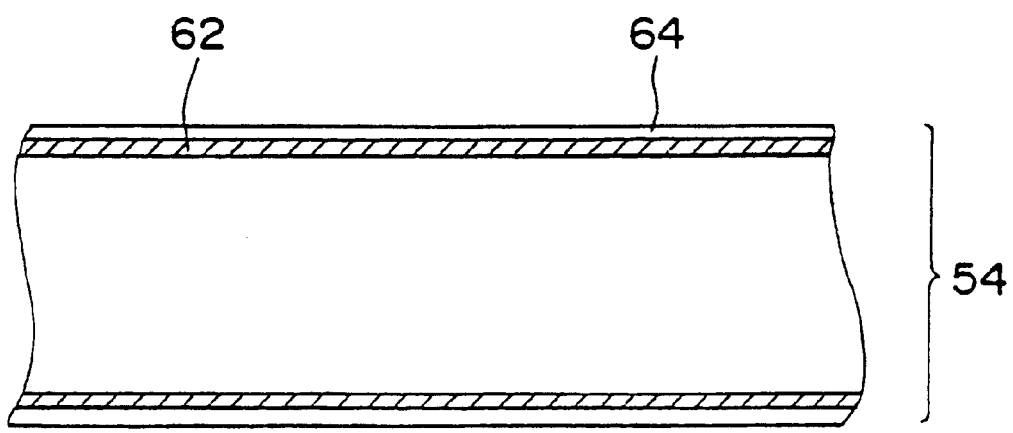
FIG. 6 is a sectional view a structure of a third boom according to the present invention.
Figure 7:
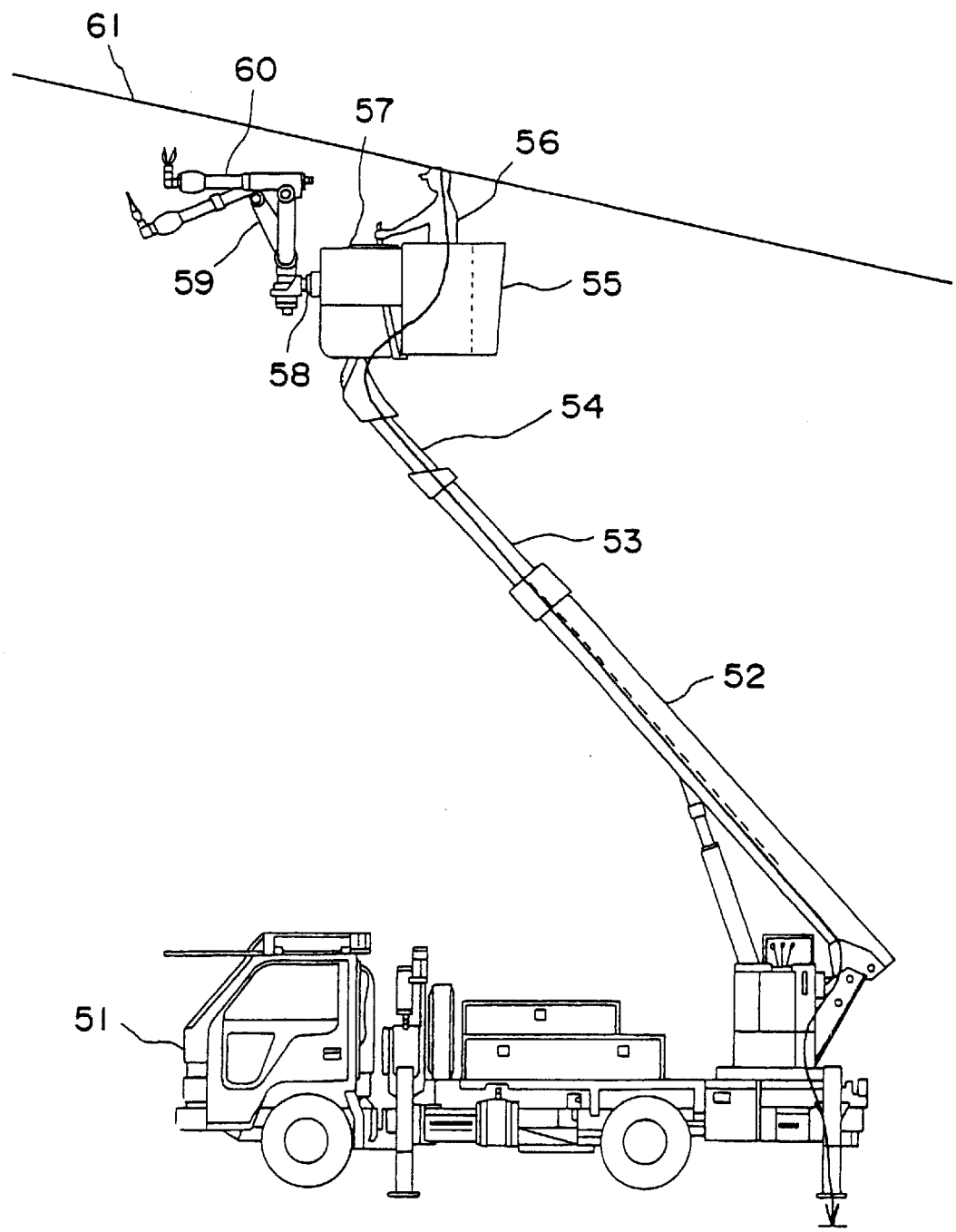
FIG. 7 is a schematic view showing an example of the occurrence of an electric shock at an operator of a man-operated robot for working on hot lines and the flow of the current at the electric shock.
Figure 8:
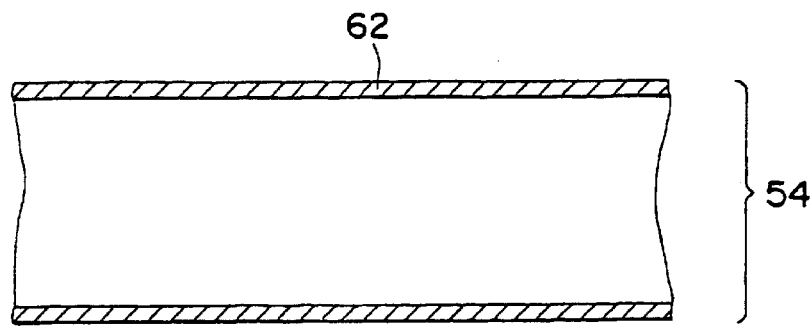
FIG. 8 is a sectional view of a structure of a conventional third boom.

FIG. 6 is a partial sectional view of a third boom showing an embodiment of the present invention. In FIG. 6, 54 represents a third boom constituted by an FRP hollow structure, and the third boom 54 comprises an FRP hollow cylinder portion 62 and a silicon compound layer 64.

Table 1 shows the results of measurement on contact angles of the inventive part and a conventional part to compare the water repellency of the surfaces thereof. The longer the contact angle, the higher the water repellency thereof. It is apparent that the contact angle of the conventional part is as small as 70° and that the inventive part applied with a silicon compound on the surface thereof has a great contact angle. That is, the water repellency of a surface is significantly improved by applying a silicon compound thereto.

TABLE 1

|  | Surface of FRP Hollow with a Silicon | Cylinder Compound Applied |
|---|---|---|
| Contact Angle | 70° | 103° |

Figure 9:
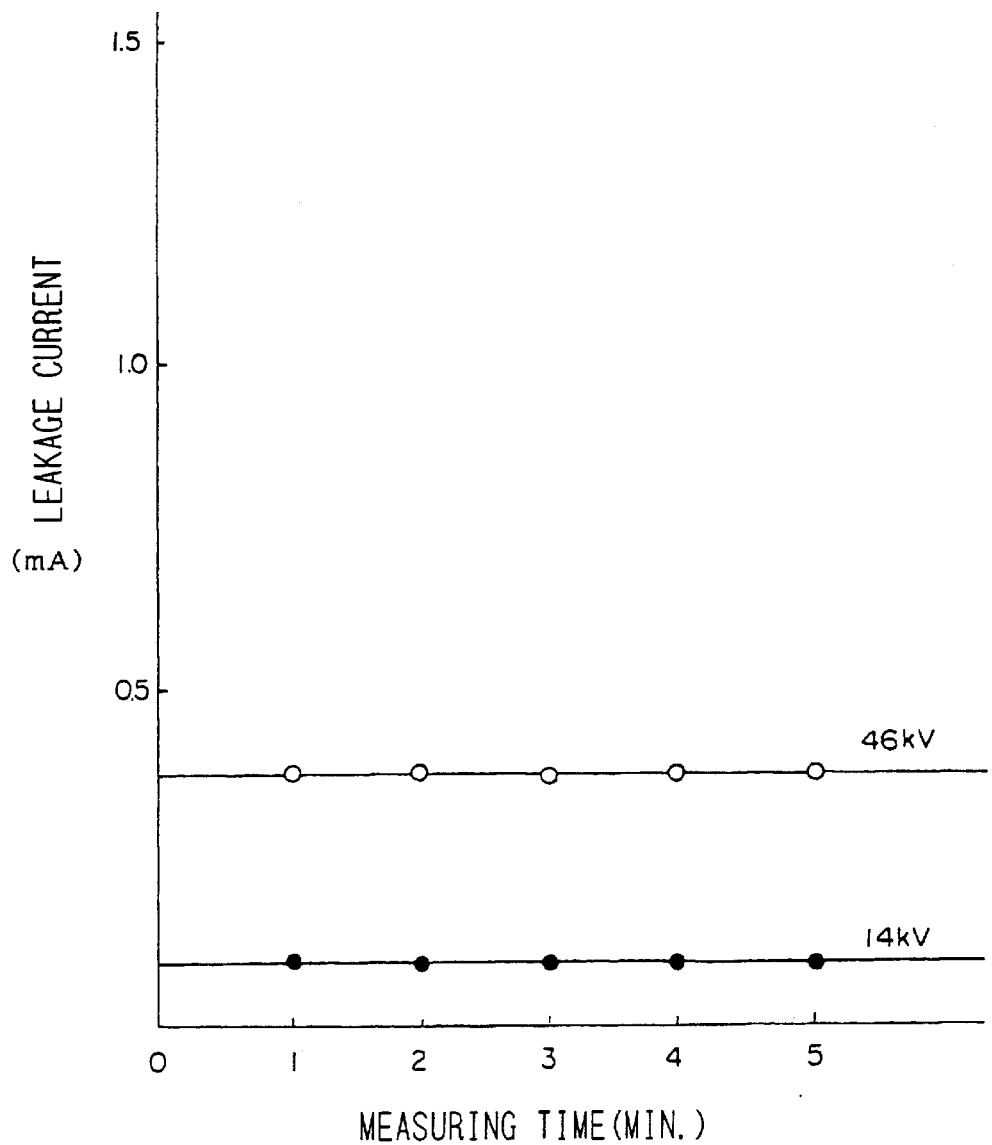
FIG. 9 is a graph showing changes over time in a leakage current during a test on a third boom according to the present invention.
Figure 10:
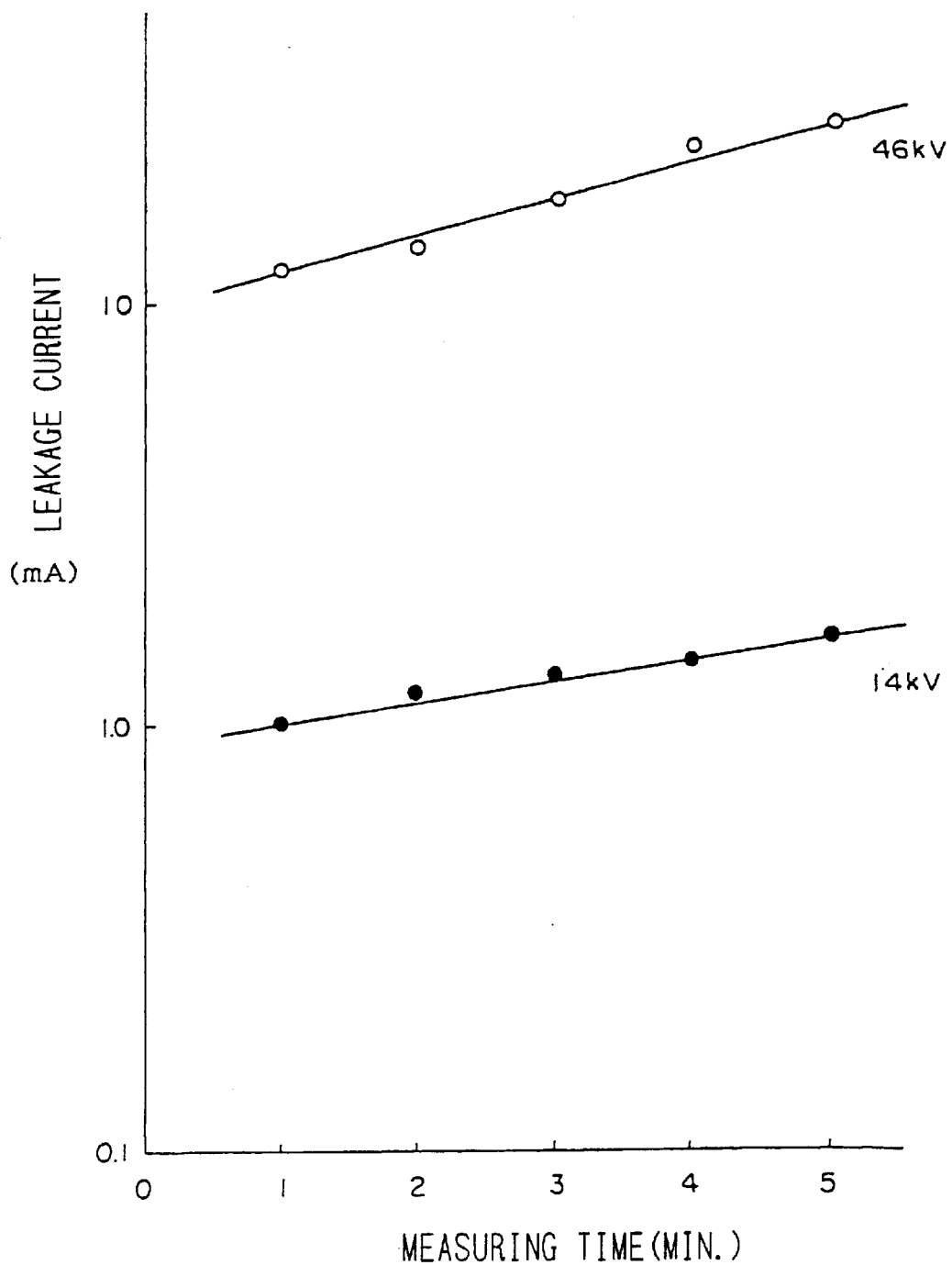
FIG. 10 is a graph showing changes over time in a leakage current during a test on a conventional third boom.

Next, evaluation was made on the inventive part and the conventional part to see the degree of the difference between leakage currents through them in rain that depends on the difference in the contact angles. Changes of the leakage currents over time in response to the application of voltages of 14 kV and 46 kV were measured under test conditions of 3 mm/min. of injected water, an water injection angle of 45°, injected water resistance of 1000 Ω·cm, a boom angle of 30° and the third boom extended to a span of one meter. FIG. 9 (the inventive part) and FIG. 10 (the conventional part) show the results.

It is shown that the leakage current of the present embodiment is 0.5 mA or less for both of those voltages. In the case of the example of the prior art, the leakage current is 0.5 mA or more from the beginning of the measurement and has a tendency to increase. Specifically, when the third boom 4 is extended to a span of 1 meters, it has a leakage current at 0.5 mA or more in rain against the applied voltage of 46 kV. Thus, the inventive part has a leakage current which is significantly lower than that in the example of the prior art and which has no tendency to increase over time, which indicates a significant effect.

With such a structure, since a silicon compound has water repellency which is significantly higher than that of a fluorine coating material, it makes it possible to keep a leakage current of 0.5 mA or less against the applied voltage of 46 kV when the boom 54 is one meter long in rain.

Table 2 shows the results of measurement of a leakage current performed after extending and retracting the third boom of the invention 1000 times. The leakage current was measured by applying a voltage of 46 kV to the boom extended to one meter under test conditions of 3 mm/min. of injected water, an water injection angle of 45°, injected water resistance of 1000·Ω and a boom angle of 30°. The third boom substantially no damage thereon and, therefore, no increase in the leakage current resulting from a reduction in the water repellency is observed.

TABLE 2

|  | Value after 1000 times | Initial Value of extension and retraction |
|---|---|---|
| Leakage Current | 0.39 mA | 0.39 mA |

As described above, according to the first mode of carrying out the invention, by applying a silicon compound having high water repellency and lubricity on the surface of a third boom of a robot for working on hot lines, the water repellency of the surface of the third boom is improved and, as a result, the leakage current flowing through the third boom in rain can be reduced to keep the leakage current through the boom at 0.5 mA or less when the boom length is one meter during an operation of the robot for working on hot lines in rain, which makes it possible to improve the operability of the robot for working on hot lines. Further, since damage on the surface of the third boom is significantly reduced by the improved lubricity of the surface of the third boom, it is possible to prevent any reduction in the water repellency of the surface of the third boom and, as a result, electric shocks to an operator of the robot for working on hot lines can be avoided. In addition, even when rain falls on the surface of the third boom when a voltage is applied to the third boom, since discharge at the surface of the third boom is suppressed, it is possible to prevent any abrupt reduction in the water repellency of the surface of the third boom.

Next, a second mode of carrying out the invention will be described based on FIGS. 11 and 12.

Figure 11:
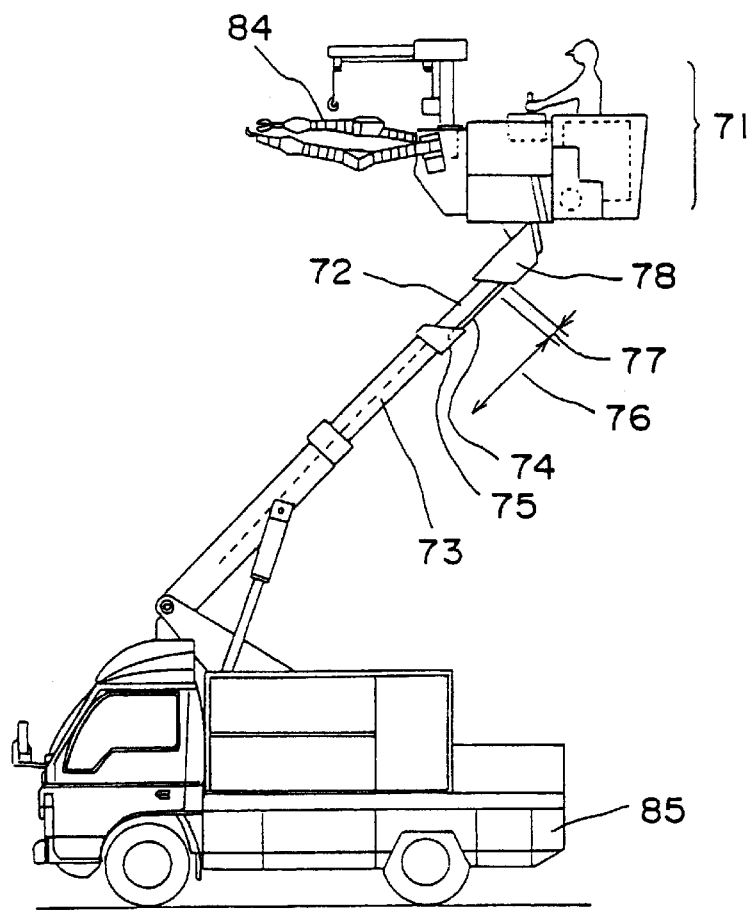
FIG. 11 is a schematic diagram of a configuration of a vehicle for high-place work.

FIG. 11 is a schematic view of an example of a configuration of a vehicle for high-place work. In the same figure, an extending boom 72 having a diameter of 180 mm is provided on a part of a boom extending from a vehicle 85, and it slides on a roller 75 in a container boom 72 to extend and retract back and forth.

Further, a sliding surface 76 and a non-sliding surface 77 of the surface of the extending boom 72 has an insulation film 74 formed by applying a silicon compound (e.g., KS63G manufactured by Shin-Etsu Chemical Co., Ltd.

Figure 12:
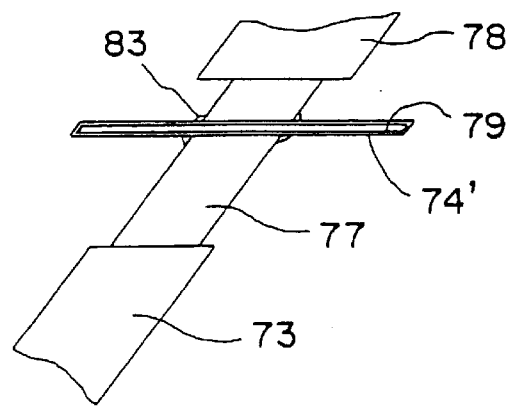
FIG. 12 is a side sectional view of an example of a method of insulation according to an embodiment of the present invention.
Figure 13:
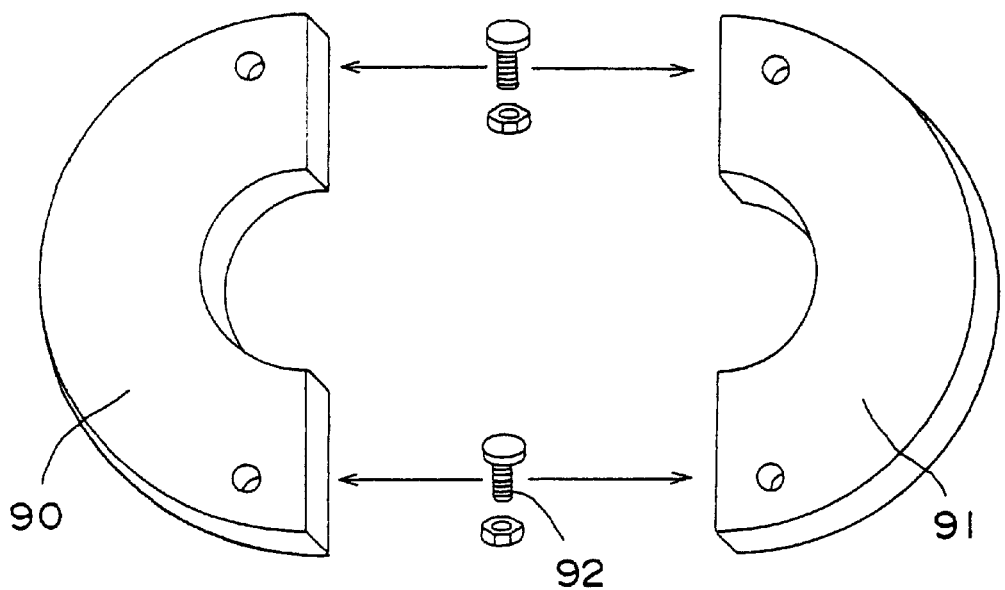
FIG. 13 is a perspective view of an example of an umbrella according to an embodiment of the present invention.
Figure 14:
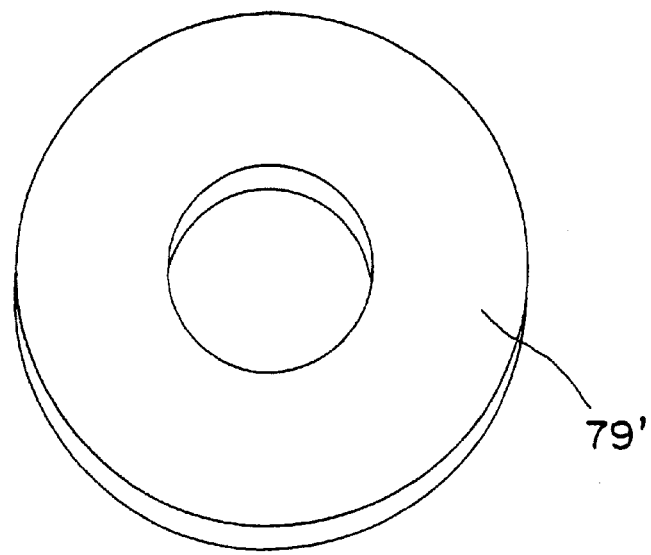
FIG. 14 is a perspective view of an umbrella according to an embodiment of the present invention.

FIG. 12 shows a structure as shown in FIG. 11 in which no silicon compound layer 64 is formed on the surface of the extending boom 72 and in which an umbrella 79 is mounted on the non-sliding surface 77 which is not contact with the roller 75. The umbrella 79 has a semicircular configuration with a diameter of 300 mm and a thickness of 5 mm as shown in FIG. 13 when it is mounted on the extending boom 72 at a post-process and comprises umbrella components 90, 91 made of GFRP and an insulated bolt 92 made of an insulating material. Referring to the mounting method for the umbrella 79, the umbrella components 90, 91 are aligned with the non-sliding surface 77 of the extending boom 72 and are secured thereto by inserting the insulated bolt 92 to a coupling plate made of an insulating material which is not shown. Then, one-pack type RTV silicon rubber (KE45W manufactured by Shin-Etsu chemical Co., Ltd.) is filled into the engaging portions and holes of the umbrella components 90 and 91 and the gap between themselves and the extending boom 72, and a silicon compound is applied to the surface thereof to form an insulation film 74'. When the umbrella of the present invention is provided during the assembly of the boom, as shown in FIG. 14, a disc-shaped umbrella 79' with a diameter of 800 mm and a thickness of 5 mm having a hole in the center thereof.

Figure 15:
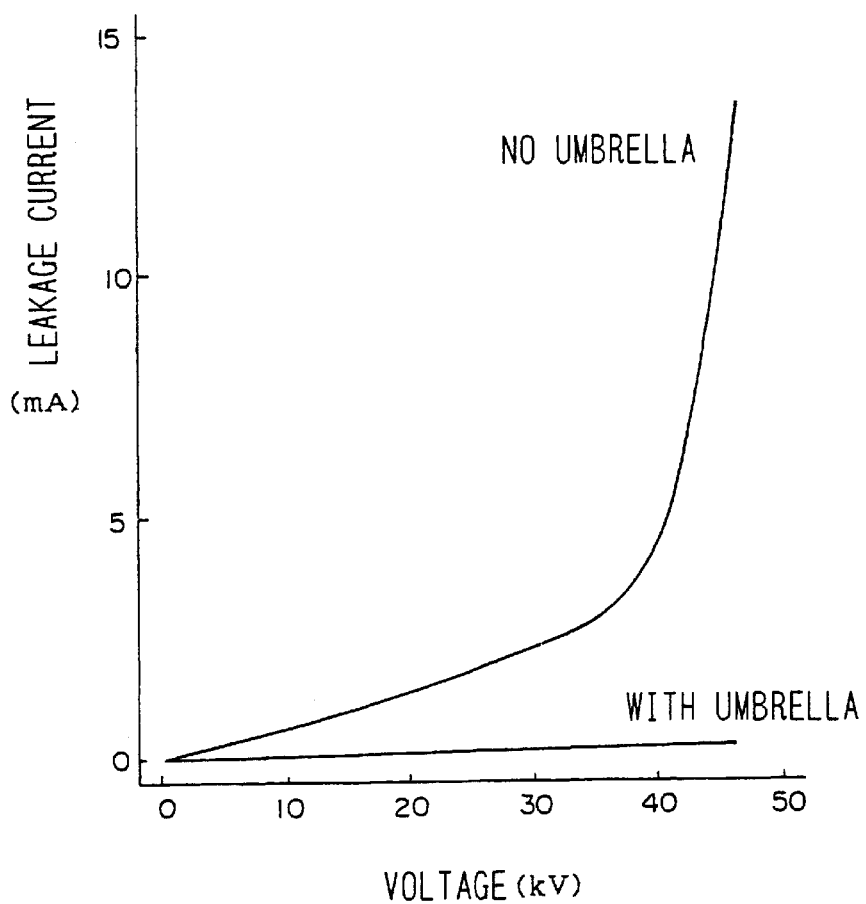
FIG. 15 is a graph showing the relationship between methods of insulation and a leakage current.

Next, the effect of the umbrella will be described. FIG. 15 shows the relationship between an applied voltage and a leakage current when the extending boom is extended to a span of one meter. First, when the umbrella 79 is not provided on the surface of the extending boom 72, the leakage current is as high as 13 mA against 46 kV. When the umbrella 79 is mounted, it is as considerably low as 0.24 mA. Thus, when the umbrella 79 is mounted, the insulation distance on the non-sliding surface 77 of the extending boom 72 is increased and the water repellency is improved, which indicates that this is effective in reducing the leakage current.

The radial length of umbrella 79 used here from the inner circumference to the outer circumference is 60 mm, and a length of 60 mm or more will be sufficient when 48 kV is applied. When a lower voltage is applied, the creepage distance may be shorter than this.

Figure 16:
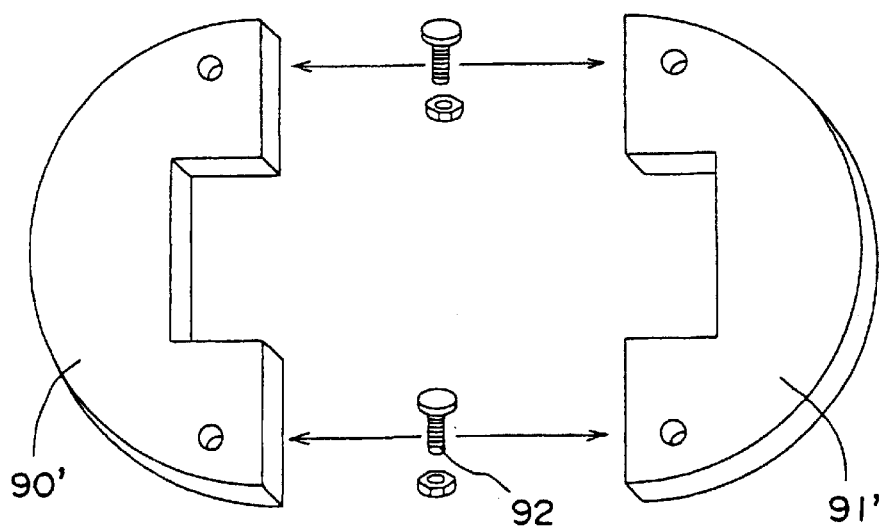
FIG. 16 is a perspective view of another example of an umbrella according to an embodiment of the present invention.
Figure 17:
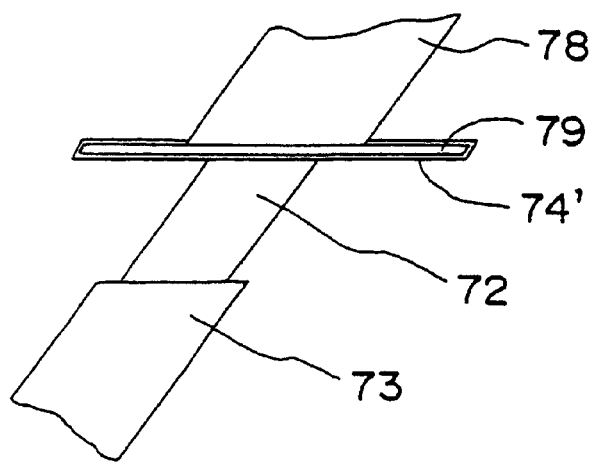
FIG. 17 is a side sectional view of an example of a method of insulation according to an embodiment of the present invention.
Figure 18:
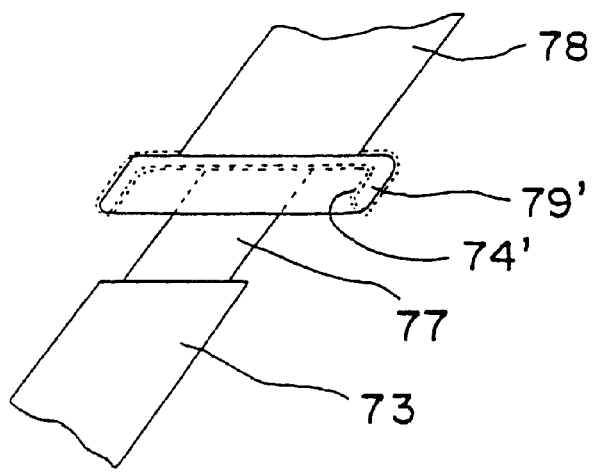
FIG. 18 is an illustration showing another example of an umbrella according to an embodiment of the present invention.

When the extending boom 72 has a rectangular sectional configuration, the mounting portions of umbrella components 90', 91' have a rectangular configuration as shown in FIG. 16. In this case, the shortest length of the umbrella from the inner side to the outer side is again 60 mm. As shown in FIG. 17, the umbrella may be mounted in a position in which one side of the umbrella 79 is in close contact with a base portion 78 of a robot for working on hot lines. As shown in FIG. 18, the umbrella may have a configuration such that it covers the surface of the extending boom 72.

The first mode of carrying out the invention and the second mode of carrying out the invention may be combined. Specifically, a silicon compound may be applied to the surface of the extending boom 72, and the umbrella 79 having a silicon compound applied thereon may be used in addition.

The present invention may be applied not only to a vehicle for high-place working carrying a robot 71 for working on hot lines for work on distribution lines as shown in FIG. 11 but also to a vehicle for high-place work having a structure in which a bucket is provided on the end of an extending boom 72. Further, it may also be applied to a ground-operated robot for high-place work which is operated by an operator on the ground.

Figure 19:
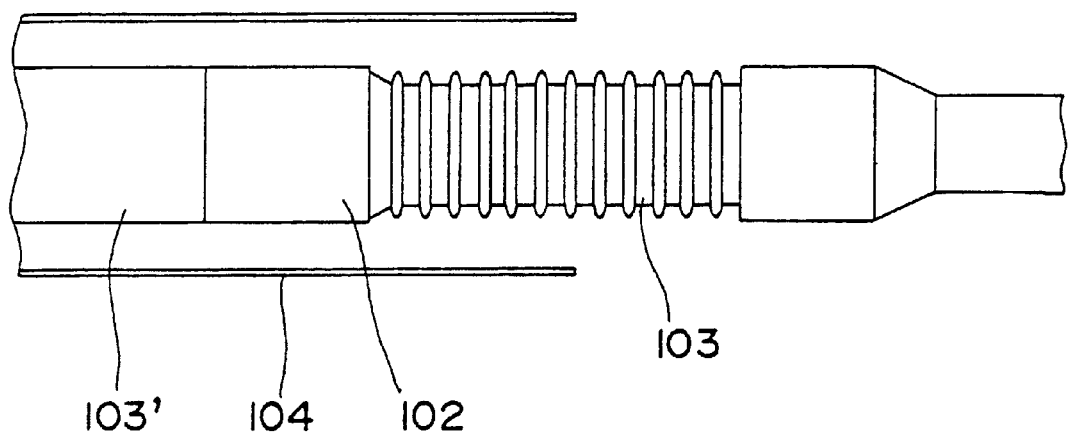
FIG. 19 is a side view of an example of a conventional insulated protective cover.
Figure 20:
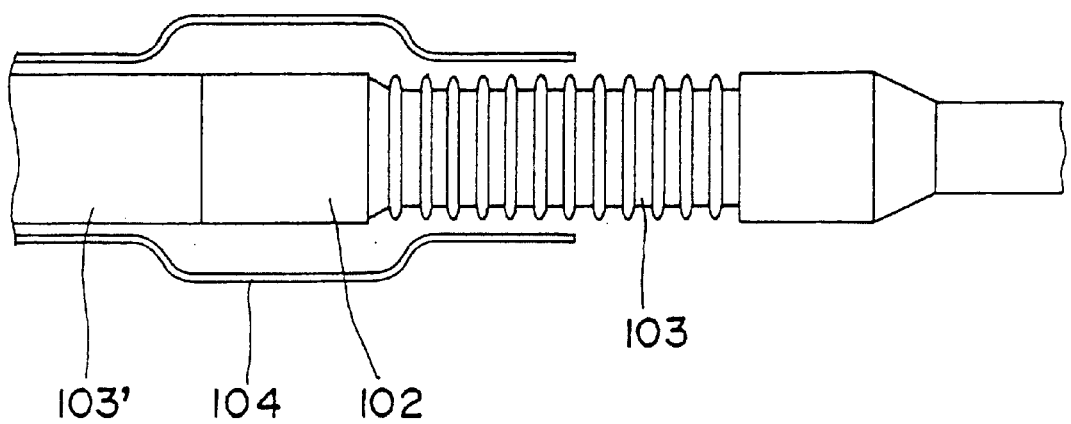
FIG. 20 is a side view of an example of an insulated protective cover according to the present invention.

An insulated protective cover according to the invention will now be described. FIG. 19 shows a configuration of an insulated protective cover according to the prior art. An insulated protective cover 104 is mounted on a manipulator comprising insulated portions 103, 103', a metal portion 102 and the like. The insulated protective cover 104 is made of a material having high water repellency. The creepage distance from the end of the metal portion 102 to the end of the insulated protective cover 104 is 950 mm, and the length of an air gap between the metal portion 102 and the insulated protective cover 104 is 60 mm. FIG. 20 shows a configuration of an insulated protective cover according to the present invention in which an insulated protective cover 104 maintained at an air gap of 60 mm from the metal portion 102 only in a part thereof is mounted in a region which can contact with distribution wires.

According to the present invention, the same concept equally applies to handing of distribution wires in the 6 kV class. It equally applies not only vehicles for high-place work carrying a robot for working on hot lines but also to vehicles for high-place work which have a bucket and which carry an operator.

Thus, it is possible to prevent tracking and insulation breakdown in the penetrating direction even when a distribution wire touches the surface of the insulated protective cover 104 located outside the metal portion 102. Further, it is possible to prevent any shorting accident which can burn a distribution system and devices on a vehicle for high-place work, thereby allowing safety to be maintained continually.

Figure 21:
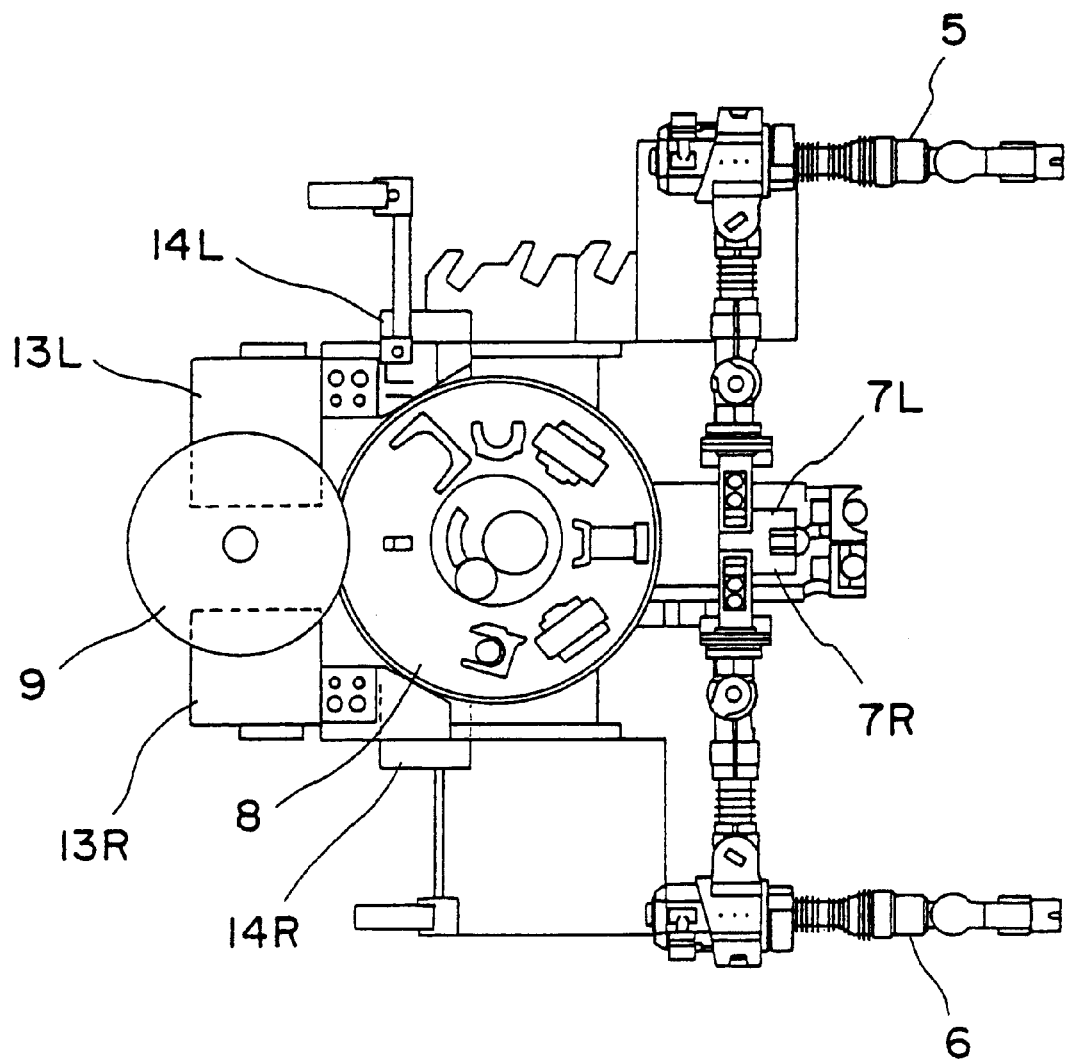
FIG. 21 is a plan view of a system configuration on a base according to a second embodiment of the present invention.

FIG. 21 is a plan view of a system configuration on a base according to a second embodiment of the present invention. In FIG. 21, 5 represents an electrical left manipulator having a seven-shaft configuration; 6 represents an electrical right manipulator having a seven-shaft configuration; 7L represents a left sliding device which carries the left manipulator; 7R represents a right sliding device which carries the right manipulator; 13L, 13R represent robot controllers for controlling the left and right manipulators; and 14L, 14R represent generators for supplying power to the left and right robot controllers. The two manipulators are symmetrically constructed but have the same configuration.

Thus, in order to prevent phase shorting accidents which can occur when two electrical manipulators having a multi-shaft configuration touch hot lines in different phases simultaneously, separate robot controllers for controlling the two manipulators and separate generators for supplying power are provided; those robot controllers and generators are secured to a base constituted by an insulator; and signals between the two separate robot controllers are exchanged using an optical cable. As a result, the two manipulators can be electrically insulated. It is therefore possible to allow practical use of a robot vehicle for hot-line job which can be applied to outage-free maintenance techniques for distribution and maintenance work at a high class of line voltage (22 kV class).

Figure 22:
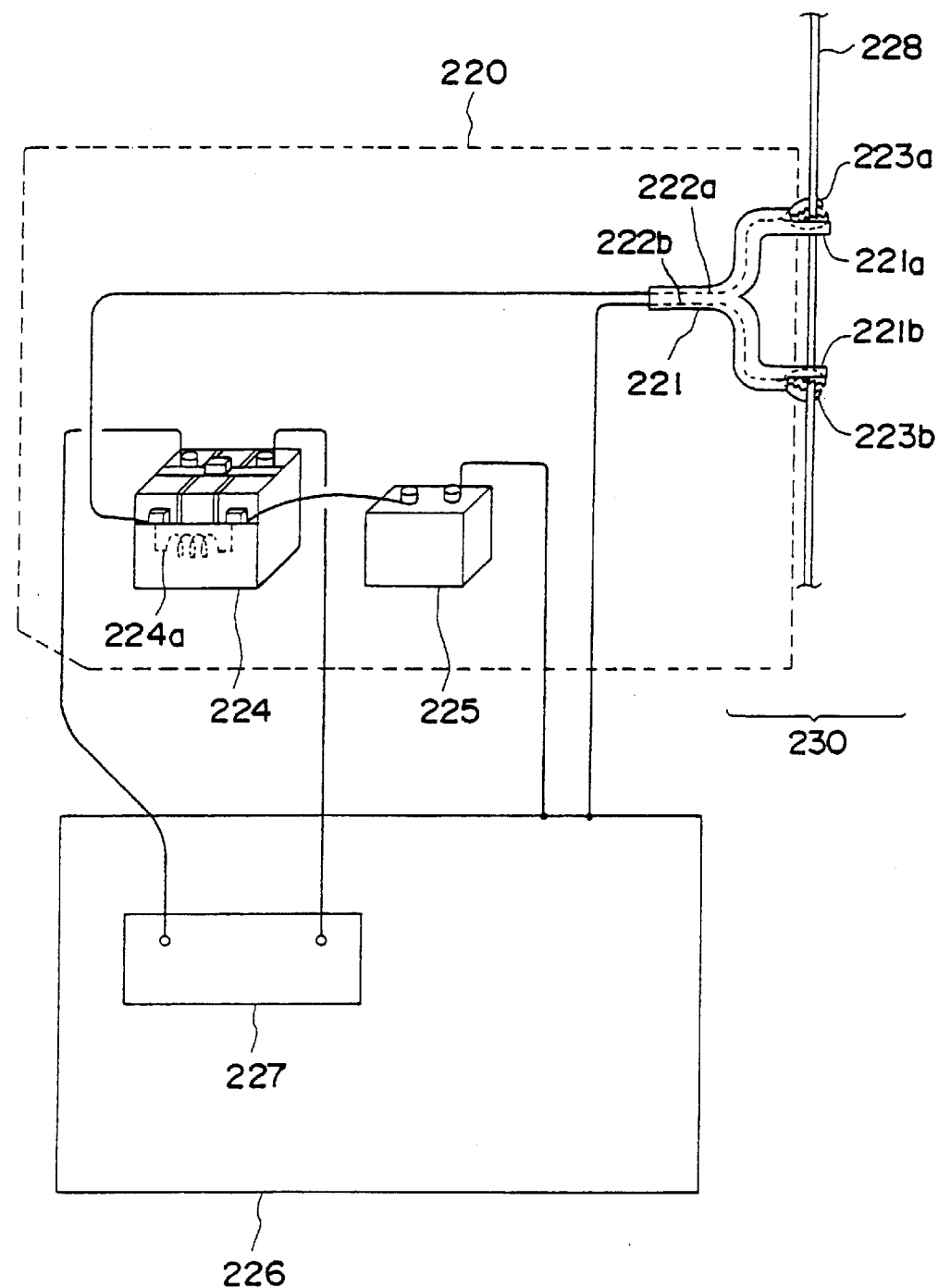
FIG. 22 is a schematic view of a first embodiment of an earth interlock device of the present invention.
Figure 23:
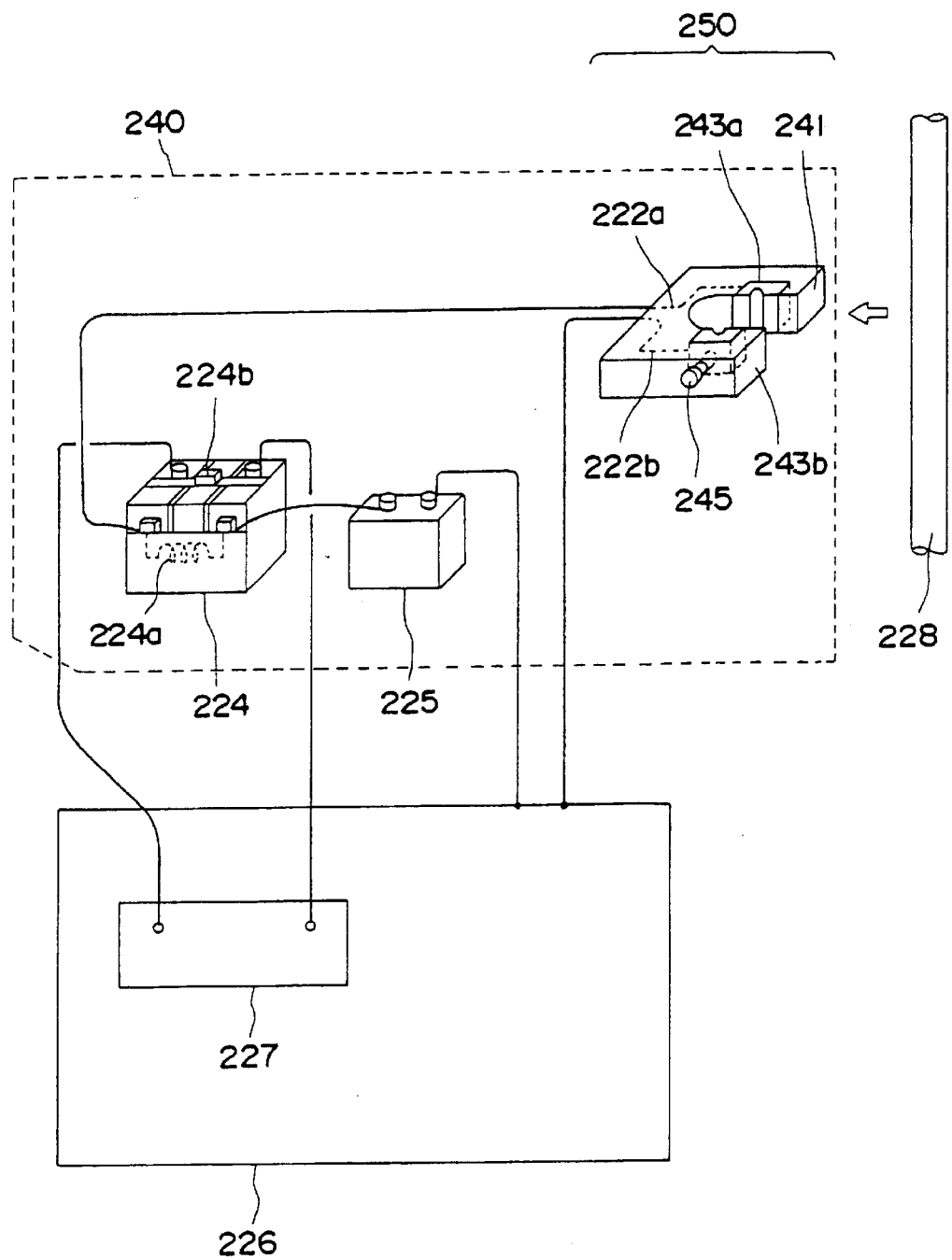
FIG. 23 is a schematic view of a second embodiment of an earth interlock device of the present invention.

A description will now be made on an earth interlock device according to the present invention. FIG. 22 shows a first embodiment thereof, and FIG. 23 shows a second embodiment.

In FIG. 22, an interlock device 220 comprises two conductors 222a, 222b, a probe 230, an electromagnetic contactor 224 and a battery 225, and a connection fitting 223a, a coil 224a of the electromagnetic contactor 224 and the battery 225 are connected in series. The conductor 222b and battery 225 are connected to a main body 226 of electrical devices. As a result, a circuit is formed by the connection fitting 223a, the conductor 222a, the coil 224a of the electromagnetic contactor 224, the battery 225, the main body 226 of electrical devices, the conductor 222b and a connection fitting 223b.

The connection fittings 223a, 223b have a structure in which they can be connected and secured to a ground wire 228 and are provided on the ends of the conductors 222a, 222b. An insulator 221 has connection fitting cover portions 221a, 221b for containing the connection fittings 223a, 223b at the end thereof, and the connection fitting cover portions 221a, 221b have a structure in which the connection fittings 223a, 223b are spaced to prevent contact with each other and are oriented outwardly. The conductors 222a, 222b with connection fittings 223a, 223b connected thereto are contained in the insulator 221. This is referred to as "probe 230". The electromagnetic contactor 224 has a contact 224b which is magnetized by a current that flows through the coil 224a to close the circuit, and the contact 224b is connected to an operation circuit 227 of the electrical devices. The battery supplies power to the electromagnetic contactor 224.

Earthing is provided by securing the connection fittings 223a, 223b to the ground wire 228. As a result, the circuit is closed because the connection fittings 223a, 223b conduct through the ground wire 228; the coil 224a of the electromagnetic contactor 224 is magnetized by the power supplied by the battery 225 to close the contact 224b; and this enables the operation circuit 227 of the electrical devices to enable electrical devices 226. In case of poor contact due to causes such as disconnection between the connection fittings 223a, 223b and the ground wire 228 during the use of the electrical device, the supply of a voltage to the coil 224a of the electromagnetic contactor 224 is stopped to cancel the magnetized state, and the contact 224b is opened. This disables the electrical devices.

FIG. 23 shows a second embodiment of the earth interlock device and, in a probe 250 of the present interlock device 240, the conductors 222a, 222b of the embodiment in FIG.

22 are respectively connected to a fixed connection fitting 243a and a movable connection fitting 243b provided in a single insulator 241, and the movable connection fitting 243b can be fastened toward the fixed connection fitting 243a with an insulating screw 245. A recess to accept the ground wire 228 is provided on a surface facing both of the connection fittings 243a, 243b. The configuration is otherwise the same as that in FIG. 22.

In the present embodiment, earthing is provided by fastening the insulating screw 245 to sandwich the ground wire 228 with the connection fittings 243a, 243b. As a result, the circuit is closed because the connection fittings 243a, 243b conduct through the ground wire 228; the coil 224a of the electromagnetic contactor 224 is magnetized by the power supplied by the battery 225 to close the contact 224b; and this enables the operation circuit 227 of the electrical devices to enable electrical devices 226.

When the operator fails to provide earthing in the embodiments in FIGS. 22 and 23, the coil is not magnetized because the two conductors do not conduct and, therefore, the operation circuit is not turned on. Since this disables the use of the electrical devices, earthing is provided without fail before using the electrical devices. Further, safety can be always maintained because it is possible to monitor the state of electrical grounding between the main body of the electrical devices and the ground wire in real time.

An embodiment of the present invention will now be described based on the drawings.

Figure 24:
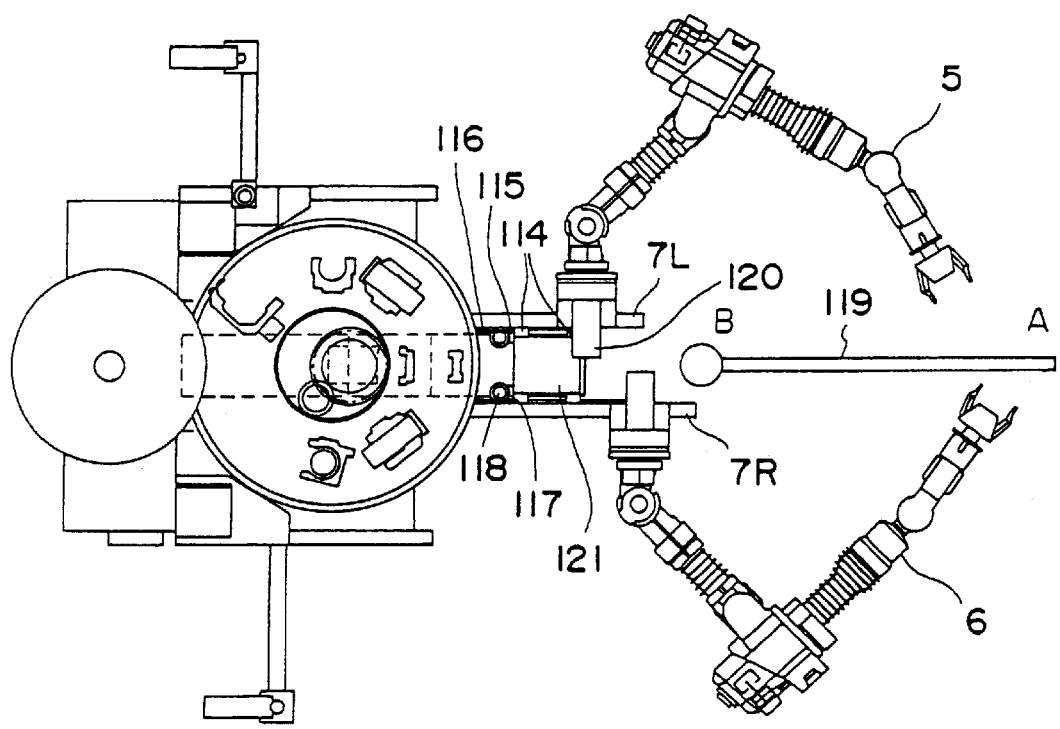
FIG. 24 is a plan view of an operating posture of a robot for working on distribution lines having slide shafts in a conventional configuration.
Figure 25:
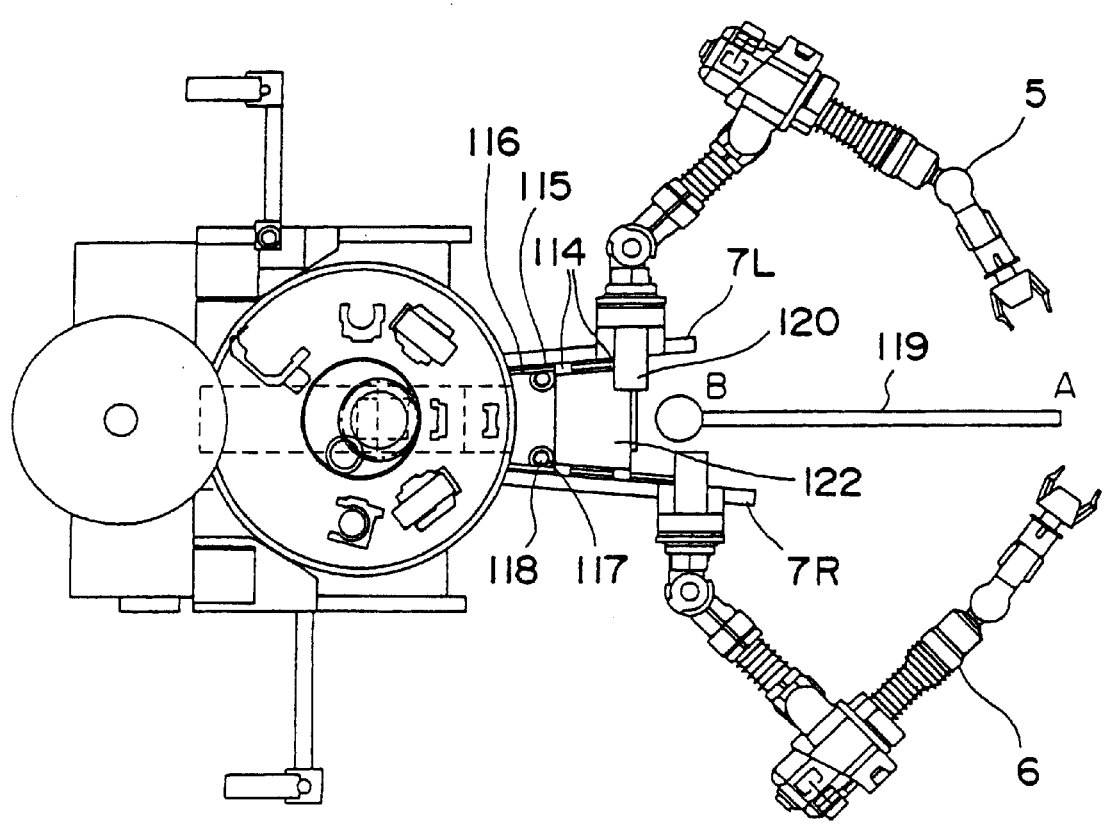
FIG. 25 is a plan view of an operating posture of a robot for working on distribution lines having slide shafts in a configuration according to the present invention.

FIG. 24 is a plan view of an operating posture of a robot for working on distribution wires having slide shafts in a conventional configuration, and FIG. 25 is a plan view of an operating posture of a robot having slide shafts in a configuration according to the invention.

In both of FIGS. 24 and 25, a left manipulator 5 and a right manipulator 6 of a two-armed robot are mounted on sliding devices 7L, 7R independently. A guide rail 115 and a rack 116 for driving supported by a slide unit 114 for linear guiding mounted on a fixed base 121 or 122 is mounted on the sliding devices 7L, 7R.

The sliding operation is enabled by a driving motor 117 and a pinion gear 118 secured to the fixed base 121 or 122.

The robot performs operations on a working point A on an object to be worked 119.

In FIG. 24, the robots slide in parallel with the center of the base, and the interval between both of the robots does not vary. When an operation is to be carried out on the object to be worked 119, since the interval between components 120 of the respective robots is small, a region B of the object to be worked 119 interferes with the robots, making it impossible to position the robot in the vicinity of the object to be worked 119.

In FIG. 25, slide shafts are supported on a base 122 on which the sliders 7L, 7R become apart from each other in the forward parts thereof and, therefore, the interval between the robots increases when the slide shafts are operated.

Since this makes it possible to prevent the region B of the object to be worked 119 from interfering with the components 120 of the robot as illustrated, the manipulators 5, 6 of the robots can be operated in the vicinity of the object to be worked 119.

As a result, according to the present embodiment, the configuration of slide shafts of the present invention allows robots to be positioned more closely to a working point for the same stroke of slides, which allows the robots to assume a preferable operating posture. Further, they can be retracted in a compact retracting posture as in the prior art when they are retracted. Moreover, there is no change in weight and cost because there is no increase in the number of shafts.

The angle of the expansion between two slide shafts is determined in consideration to operability (the degree of the overlap between the operating ranges of the two arms) and interference with other constituent devices. However, in the case of a robot for working on distribution wires in which the base is provided on a hydraulically driven boom, there is no need for placing an object to be worked between the robots and, if the operating ranges of both of the robots must overlap, the operation can be performed as in the prior art by placing the base as a whole closer to the object to be worked without operating the slide shafts.

According to the present invention, since slide shafts of a two-armed manipulator are configured such that they become apart from each other in the forward parts thereof, it is possible to provide a configuration of slide shafts in which only a single shaft is retracted to allow compact containment and which can be operated to allow a worked object to be placed between two-armed manipulators depending on the work without increasing the number of slide shafts and increases in the cost and occupied space associated therewith, thereby improving operability.

Figure 26:
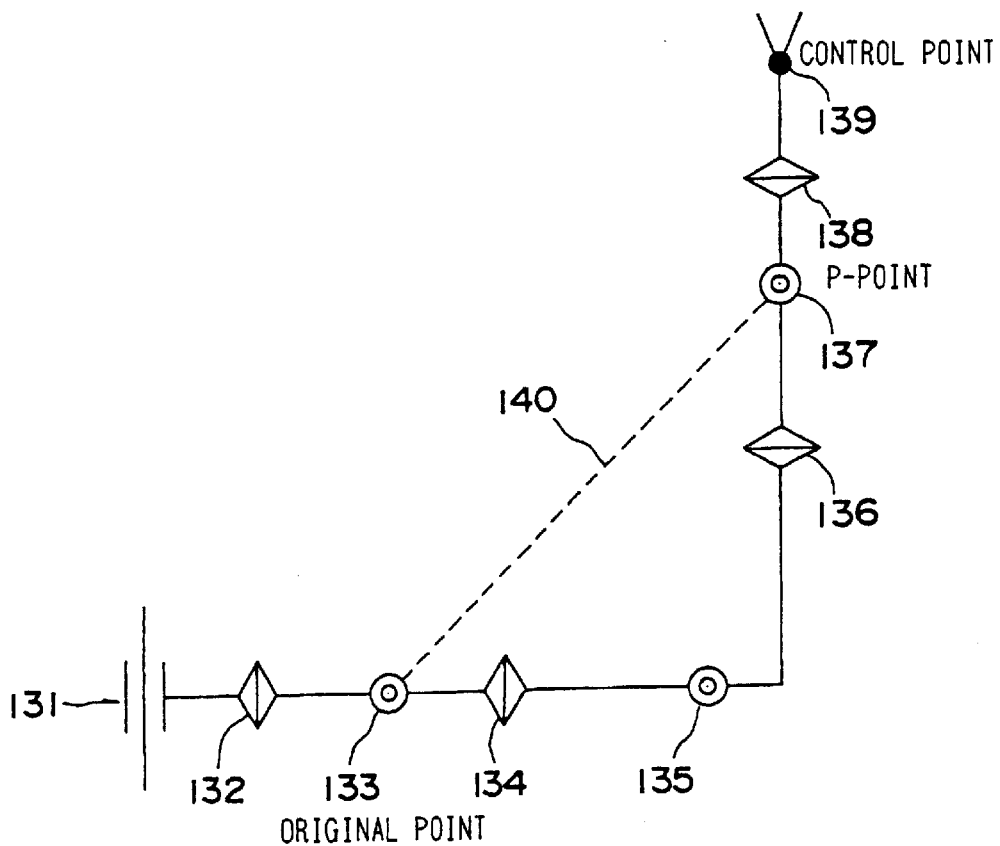
FIG. 26 shows a configuration of links of an articulated manipulator having a base with a slide mechanism.
Figure 27:
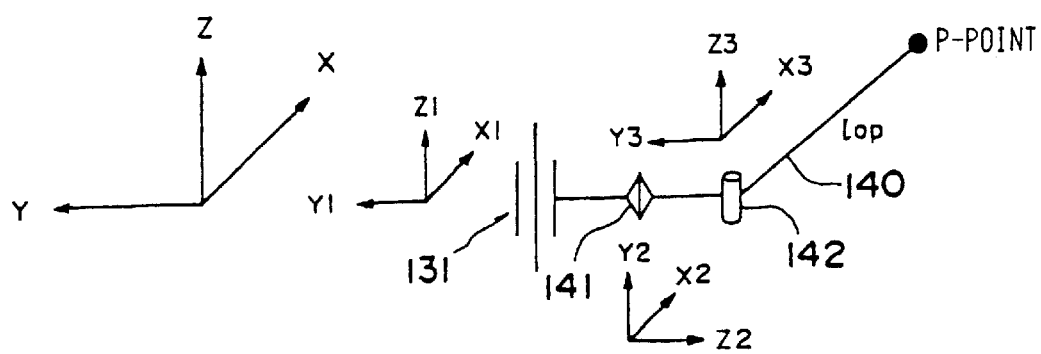
FIG. 27 illustrates a virtual link configuration and a coordinate system.

An embodiment of the present invention will now be described based on the drawings. FIG. 26 shows an example of a link configuration of an articulated manipulator having a base 34 with a sliding mechanism. A seven-shaft articulated manipulator is mounted on a slide shaft 131. This articulated manipulator 133 is an origin of articulated manipulators. 137 represents an intersection of a wrist shaft that determines the position of the articulated manipulator. While a point which determines the position of an articulated manipulator depends on the link configuration and the number of the shafts of the manipulator, a description will be made here with reference to a seven-shaft manipulator as an example. When the distance between the point to determine the position of the manipulator (hereinafter referred to as "P-point") and an origin 3 of the articulated manipulator is represented by lop, a virtual diagram 27 can be drawn on the articulator comprising a slide shaft 131, a first shaft 132, a second shaft 133 and an arm lop.

A kinetic analysis on the P-point of this virtual manipulator represented by Px, Py and Pz results in a relationship between the position of the slide shaft and lop as described below.

It is assumed here that $S_x$ represents the position of the slide shaft; $\theta_2$ represents the angle of the virtual first shaft; and $\theta_3$ represents the angle of the virtual second shaft.

$$P_x = \cos\theta_2 \cos\theta_3 \text{lop} \tag{1}$$

$$P_y = \sin\theta_3 \text{lop} \tag{2}$$

$$P_z = \sin\theta_2 \cos\theta_3 \text{lop} + S_x \tag{3}$$

Here the sum of squares of both sides is obtained as follows.

$$S_x = P_z \pm (\text{lop}^2 - (Px^2 + Py^2))^{1/2} \tag{4}$$

Figure 28:
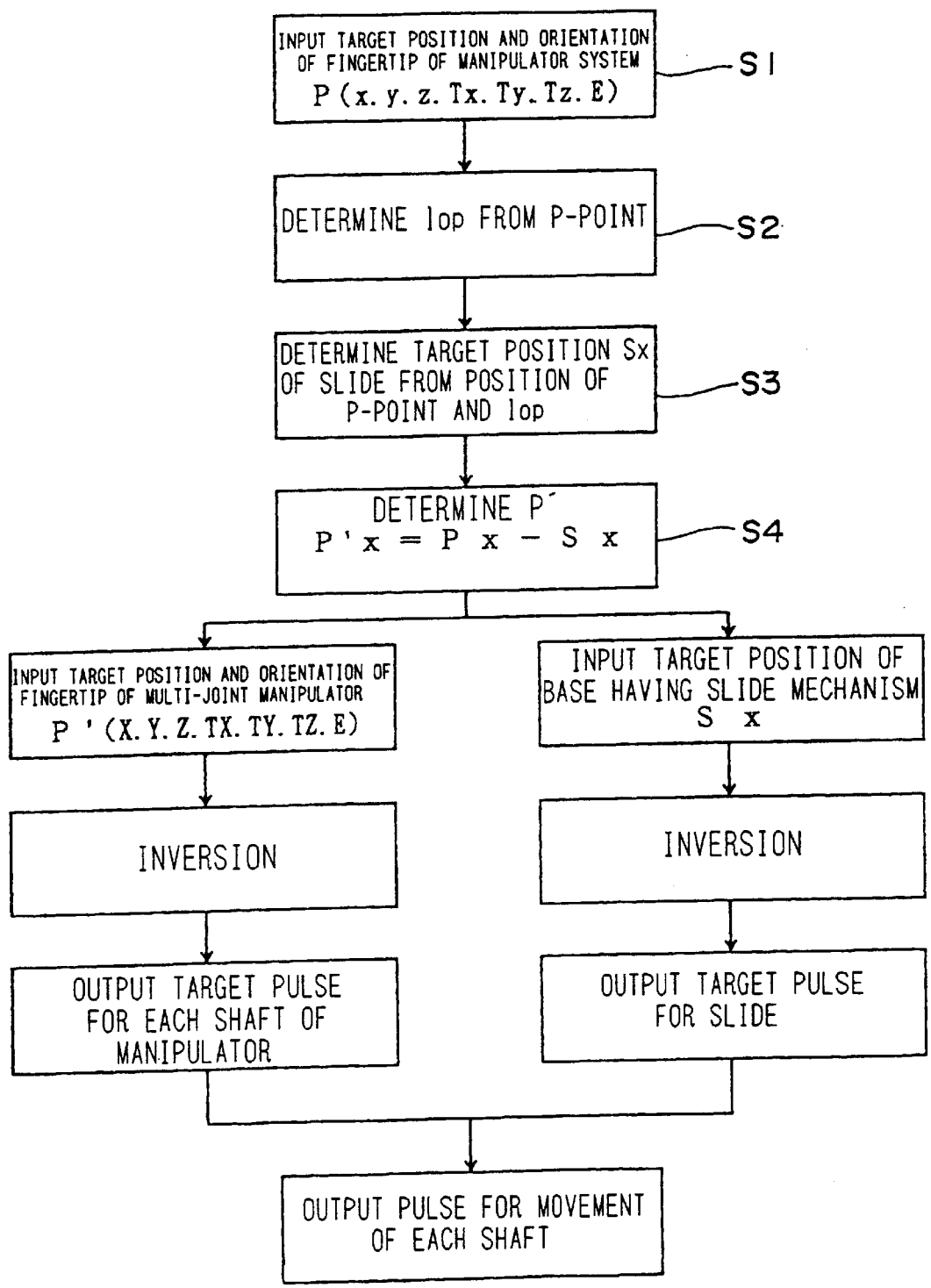
FIG. 28 is a flow chart showing processes in a course calculating portion.

Equation 4 indicates that the position of the slide shaft can be determined by lop when the position of the P-point is given. FIG. 28 is a block diagram if a course calculation which is obtained by introducing the relationship between lop and the slide into a course calculation. At step S1 in FIG. 28, the position P of the fingertip of an articulated manipulator with a base having a slide mechanism (X, Y, Z, $T_x$, $T_y$, T_z, E) is input. E is a value used in redundancy control of a seven-shaft manipulator which is not required in the case of a six-shaft manipulator. At step S2, the value of lop is varied according to certain conditions based on the value of the P-point to determine the operation ratio of the slide shaft, and the position of the slide shaft is obtained using Equation 4 at step S3. Each of the position of the slide shaft thus obtained and the position of a P'-point reached by subtracting the position of the slide shaft from the P-point is inverted to obtain the angle of each articulation of the articulated manipulator and the position of the base having the slide mechanism (step S4) to achieve simultaneous course control. It is determined by parameters whether the functions at steps S1 through S4 in FIG. 28 are to be provided or not, and it is possible to select either a conventional method or the method based on simultaneous course control. The relationship between lop and the slide shaft at step S2 can be set in various ways. An example of a method for determining lop is shown here for which it is assumed that the slide shaft does not operate in a range over which the articulated manipulator can sufficiently operate in consideration to operability and in which the slide shaft operates in an operation of the articulated manipulator in the extending direction to the degree of full extension (condition 1) and in an operation in the retracting direction to the degree close to the limit of retraction (condition 2). The minimum value $lop_{min}$ and the maximum value $lop_{max}$ of lop at this time are determined by the distance between the second and fourth shafts, the distance between the fourth and sixth shafts and the operating range of the fourth shaft. $C_{lop}$ represents the current value of lop; $d_{lop}$ represents a target value for lop; $lop_h$ represents the starting value of the operation of the slide shaft in the extending direction taken into consideration; and $lop_l$ represents the starting value of the operation of the slide shaft in the retracting direction taken into consideration.

(Condition 1)

When $d_{lop} > lop_h$ and $d_{lop} > C_{lop}$ $lop = d_{lop} + (C_{lop} - d_{lop}) \times \{(d_{lop} - lop_h)/(lop_{max} - lop_h)\}$ (5)

(Condition 2)

When $d_{lop} < lop_l$ and $d_{lop} < C_{lop}$ $lop = C_{lop} - (C_{lop} - d_{lop}) \times \{(d_{lop} - lop_{min})/(lop_l - lop_{min})\}$ (6)

Thus, lop can be determined from the relationship between the current value of lop and a target value of the same. Further, the simultaneous operating ranges of slide shafts and the operating ratios of the slide shafts can be changed by varying the values of $lop_h$ and $lop_l$.

According to the present embodiment, the position of a slide shaft can be determined by the position and orientation of the fingertip given as a target value, and slide shafts and an articulated manipulator can be simultaneously controlled. As a result, an articulated manipulator having a base with a slide mechanism can be operated without inputting the positions of the slide shafts.

Figure 29:
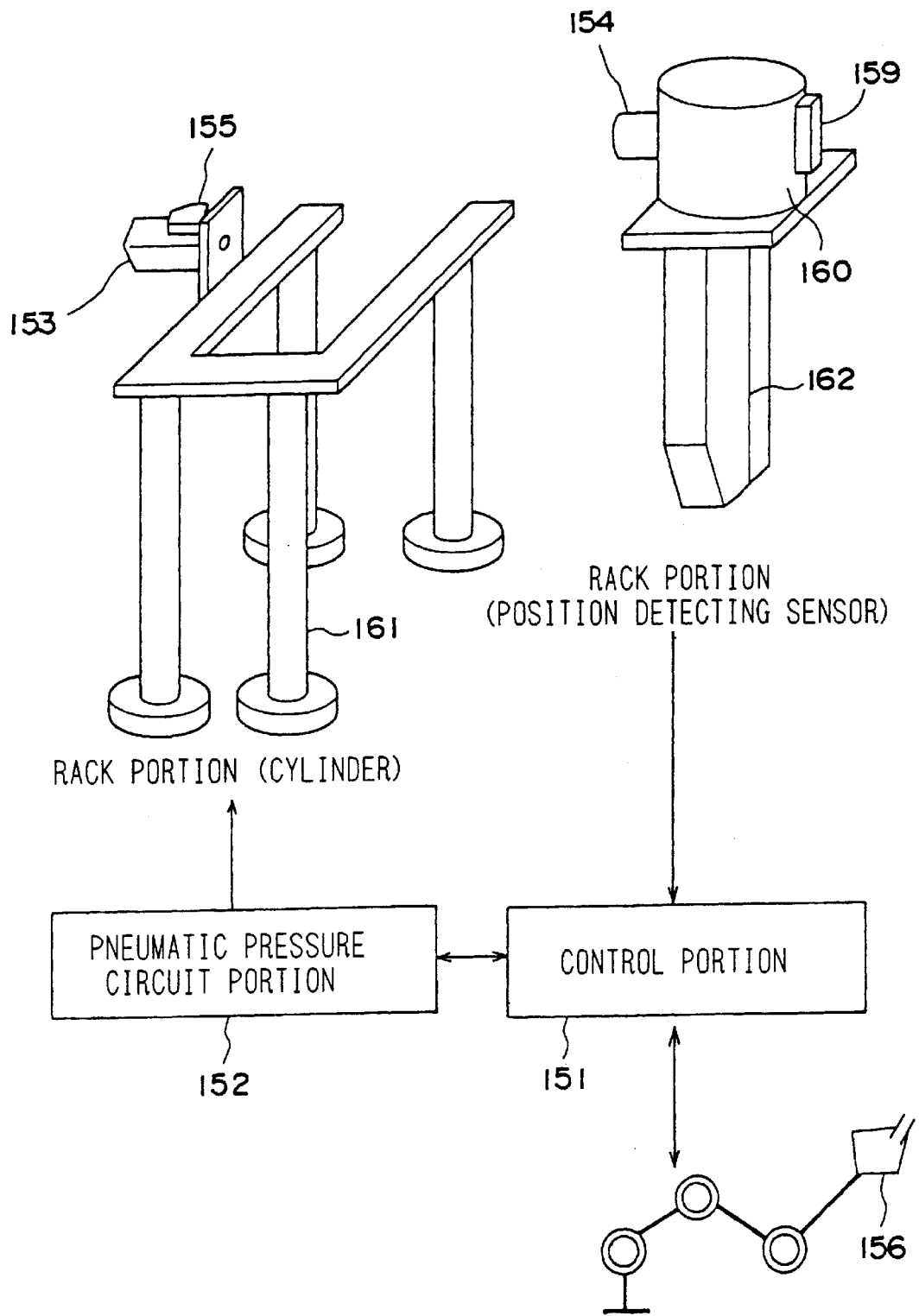
FIG. 29 is a general configuration diagram of an automatic tool changer and a manipulator.
Figure 30A:
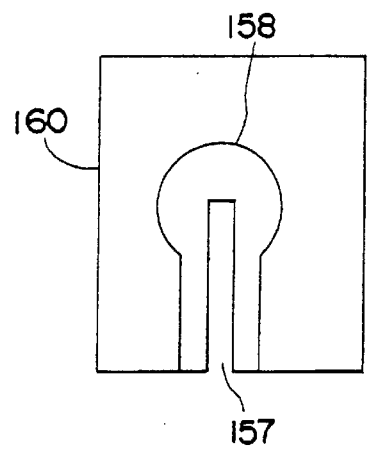
FIGS. 30(*a*) and (*b*) are a front view and a sectional view showing a configuration of a connecting portion at a manipulator.
Figure 30B:
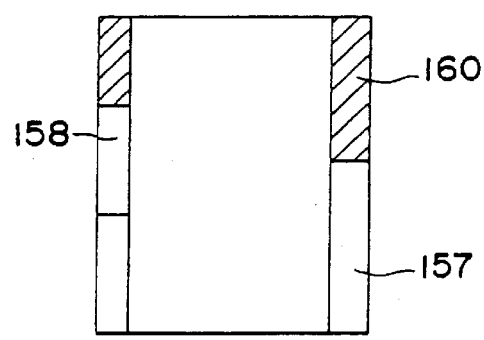
Figure 31A:
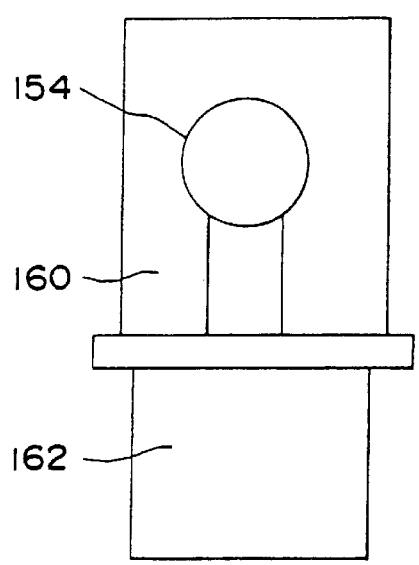
FIGS. 31(*a*) and (*b*) are a side sectional view of a tool attaching/detaching portion.
Figure 31B:
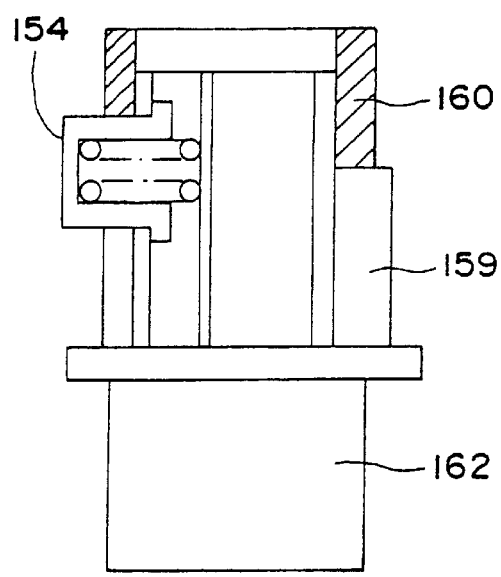
Figure 32:
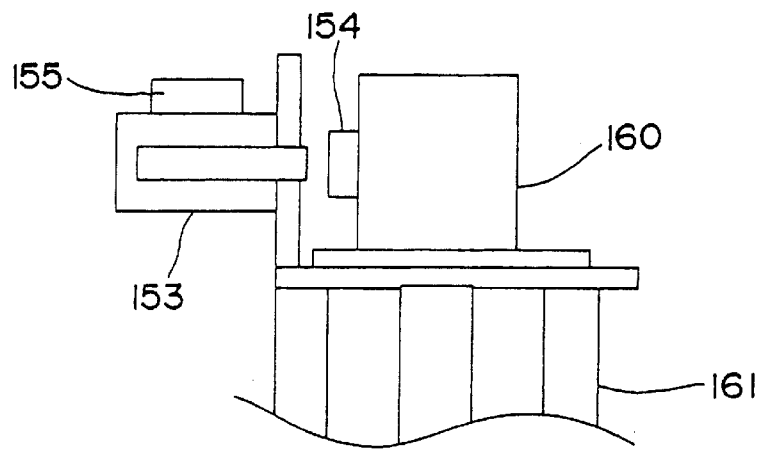
FIGS. 32(*a*)–(*c*) illustrates an operating state of an automatic tool changer.
Figure 32:
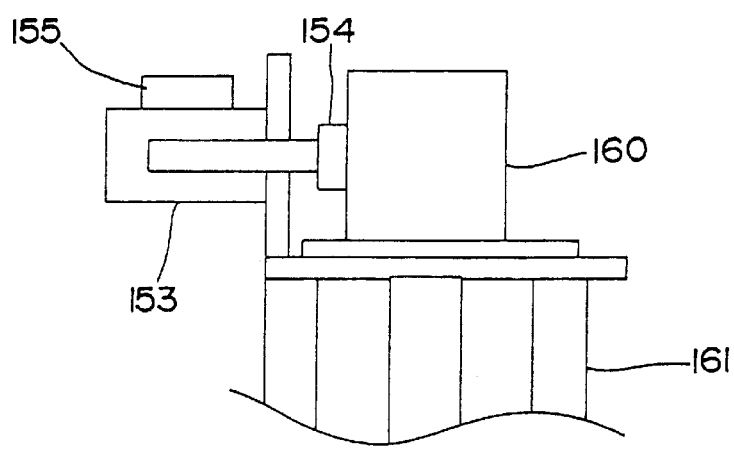
Figure 32:
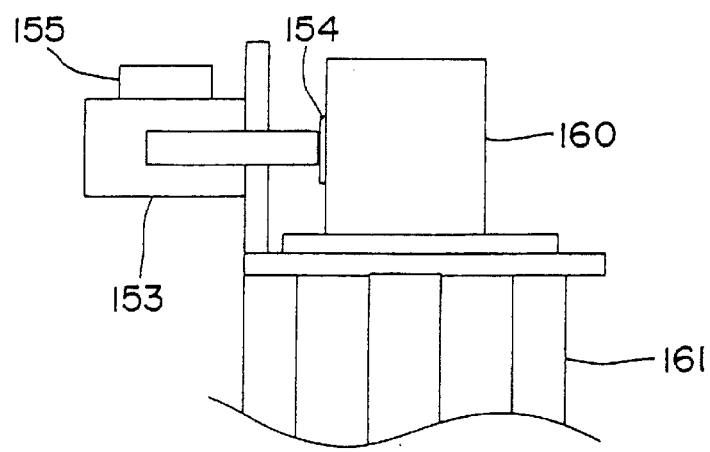

Next, a description will be made on an embodiment of an automatic tool changer. FIG. 29 is a general configuration diagram of an automatic tool changer and a manipulator according to the present embodiment; FIGS. 30 and 31 are side sectional view of a connecting portion at the manipulator and a tool attaching/detaching portion; and FIG. 32 illustrates an operating state.

In the present embodiment, a tool attaching/detaching portion 160 includes a key 159 for positioning a tool 162 in a key groove 157 on the manipulator and a clamp button 154 for securing the tool which is movable in a radial direction and which has a restoring force in the direction of moving away from the central axis thereof. A rack portion 161 includes a cylinder 153 for pushing the clamp button 154 during the attachment and detachment of a tool and a position detecting sensor 155 for detecting the position of the cylinder 153.

First, in the case of a tool attaching operation, a control portion 151 outputs a depressurization signal to a pneumatic pressure circuit portion 152 before the manipulator starts the tool attaching operation and outputs a signal to turn on the cylinder 153 having a reduced thrust force to the pneumatic pressure circuit portion 152, which causes the cylinder 153 to protrude. When there is a tool, it hits the clamp button 154 to stop the cylinder 153 on the way. When there is no tool, the cylinder 153 protrudes to the end of its stroke. The position detecting sensor 155 detects it; the output of the position detecting sensor 155 is input to the control portion 1; and the control portion 151 determines whether there is a tool 162 or not in a rack 161 of interest from the difference in the cylinder position.

When the cylinder 153 is temporarily turned off according to a command from the control portion 151 and the control portion 151 determines that there is no tool, a warning signal is output to the operator. When the control portion 151 determines that there is a tool, the control portion 151 outputs a pressure increase signal to the pneumatic pressure circuit portion 152 and outputs a signal to turn on the cylinder 153 which now has a thrust force sufficient to depress the clamp button 154 to the pneumatic pressure circuit portion 152 and, as a result, the cylinder 153 protrudes to depress the clamp button 154. The position of the cylinder 153 at that time is detected by the position detecting sensor 155; the output of the position detecting sensor 155 is input to the control portion 151; and the control portion 151 confirms that the preparation for tool attachment has been completed from the position of the cylinder. Then, the end 156 of the manipulator moves to the rack 161 on which the tool 162 is placed along a course programmed in advance and aligns the key 159 of the attaching/detaching portion 160 with the key groove 157 on the manipulator and inserts it therein, and the control portion 151 outputs a signal to turn off the cylinder 153 to the pneumatic pressure circuit portion 152. Thereafter, the cylinder 153 is retracted, and the clamp button 154 enters a hole 158 of the manipulator to clamp the tool to the manipulator. Next, a command from the control portion 151 causes the cylinder 153 to retract, and the control portion 151 confirms that the cylinder 153 has surely been retracted from a signal output by the position detecting sensor 155 and outputs a depressurization signal to the pneumatic pressure circuit portion 152. The control portion 151 outputs a signal to turn on the cylinder which now has a reduced thrust force to the pneumatic pressure circuit portion 152, which causes the cylinder to protrude. When the tool has been reliably clamped, it hits the clamp button 154 to stop the cylinder 153 on the way. In the case of unsuccessful clamping, the cylinder 153 protrudes further. The control portion 151 confirms that the tool 162 has been reliably secured to the manipulator from a signal output by the position detecting sensor 155 at that time. Then, the cylinder 153 is retracted according to a command from the control portion 151; the control portion 151 confirms that the cylinder 153 has been reliably retracted from a signal output by the position detecting sensor 155; and the end 156 of the manipulator leaves the rack to terminate the attachment of the tool. If is has not been successfully secured to the manipulator, a warning signal is output to interrupt the operation.

When the tool 162 is to be returned, the control portion 151 outputs a depressurization signal to the pneumatic pressure circuit portion 152 before the manipulator starts the tool returning operation and outputs a signal to turn on the cylinder 153 having a reduced thrust force to the pneumatic pressure circuit portion 152, which causes the cylinder 153 at the rack of the interest to protrude. When there is a tool, it hits the clamp button 154 to stop the cylinder 153 on the way. When there is no tool, the cylinder 153 protrudes to the end of its stroke. The position detecting sensor 155 detects it; the output of the position detecting sensor 155 is input to the control portion 151; and the control portion 151 determines whether there is a tool or not in the rack of interest from the difference in the cylinder position. Next, the cylinder 153 is temporarily turned off according to a command from the control portion 1; the control portion 151 confirms that there is no tool; and the manipulator moves in a course programmed in advance to place the tool in the vacant rack 161. Next, the control portion 151 outputs a pressure increase signal to the pneumatic pressure circuit portion 152 and outputs a signal to turn on the cylinder 153 which now has a thrust force sufficient to depress the clamp button 154 to the pneumatic pressure circuit portion 152. As a result, the cylinder 153 protrudes to depress the clamp button 154, and the position of the cylinder 153 at that time is detected by the position detecting sensor 155. The output of the position detecting sensor 155 is input to the control portion 151; the control portion 151 confirms that the clamp button 154 has been reliably depressed from the cylinder position; and the manipulator moves away. Thereafter, the cylinder is retracted according to a command from the control portion 151, and the control portion 151 outputs a depressurization signal to the pneumatic pressure circuit portion 152 and outputs a signal to turn on the cylinder 153 which now has a reduced thrust force to the pneumatic pressure circuit portion 152. As a result, the cylinder 153 protrudes, and the control portion 151 confirms that the tool has been reliably returned from a signal output by the position detecting sensor 155 to terminate the tool returning. If the returning to the rack is incomplete, a warning signal is output to interrupt the operation.

The present embodiment makes it possible to make the end of a manipulator slim thereby improving visibility of the same from an operator and to perform attachment and detachment of a tool, confirmation of tool attachment and detachment and determination on whether there is a tool or not with the same device (a cylinder having a position detecting sensor), which allows the reliability of a system to be improved and allows a reduced cost and more compact apparatuses.

An embodiment of a tool supplying device according to the invention will now be described.

Figure 33:
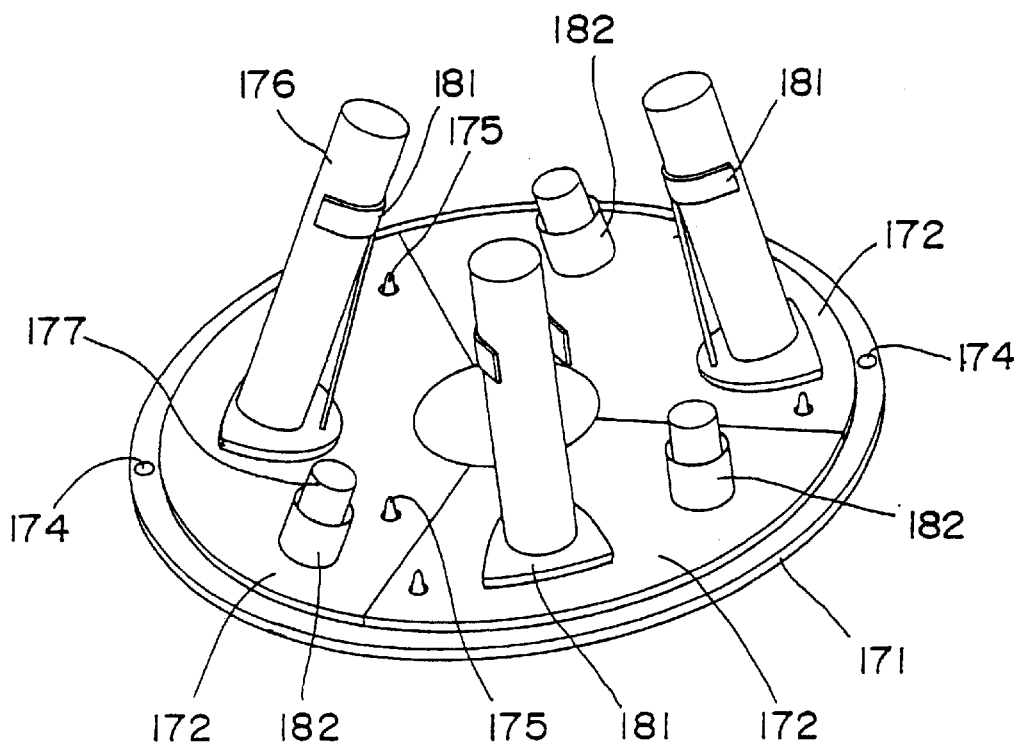
FIG. 33 is a perspective view of an embodiment of a work tool supplying device.
Figure 34:
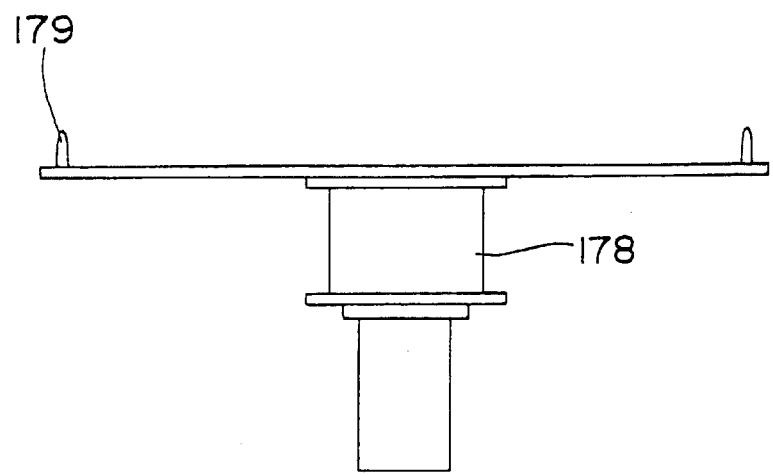
FIG. 34 is a front view of a driving portion of the work tool supplying device.
Figure 35A:
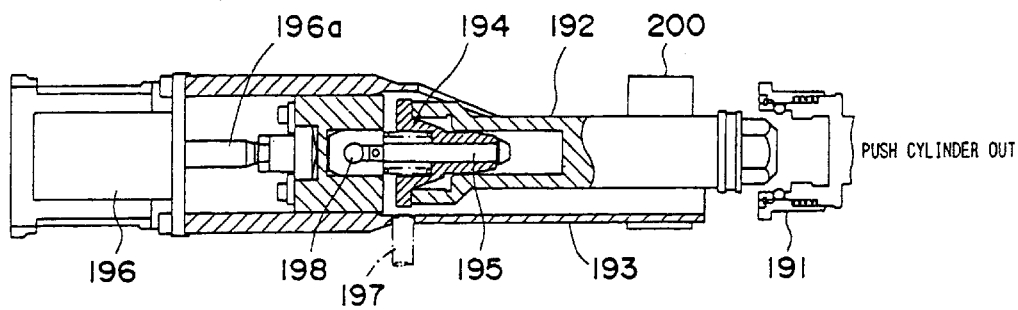
FIGS. 35(*a*)–(*d*) are a side sectional view showing the flow of removal of a socket.
Figure 35B:
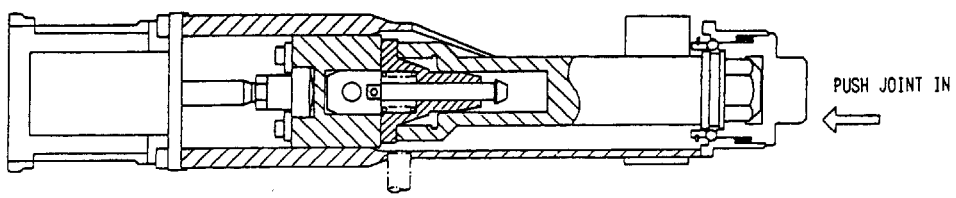
Figure 35C:
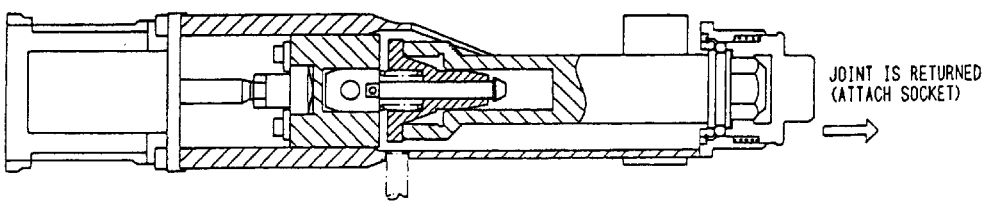
Figure 35D:
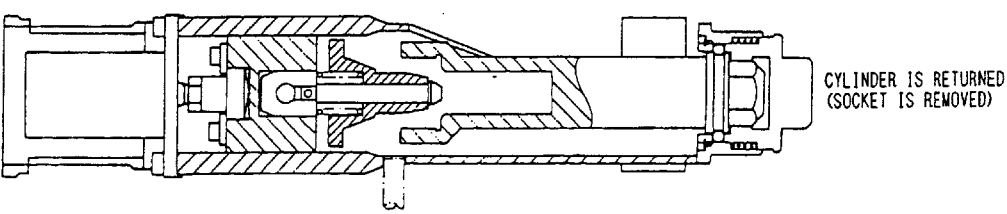
Figure 36A:
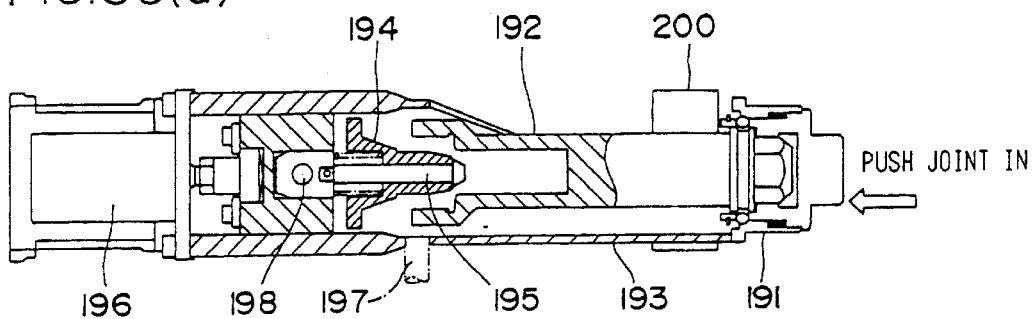
FIGS. 36(*a*)–(*d*) area side sectional view showing the flow of containment of a socket.
Figure 36B:
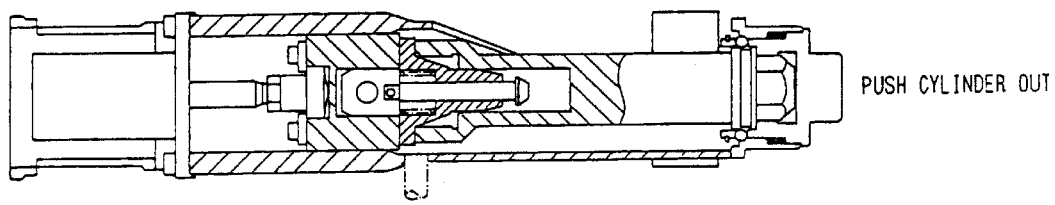
Figure 36C:
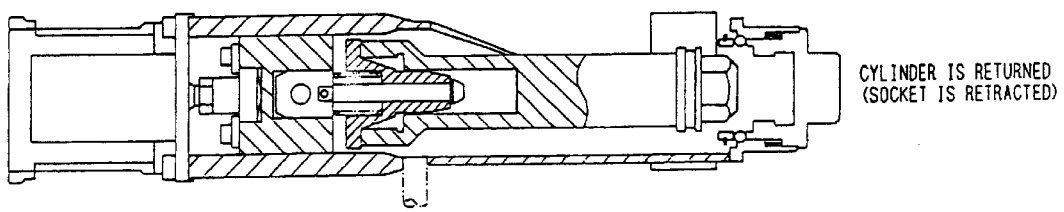
Figure 36D:
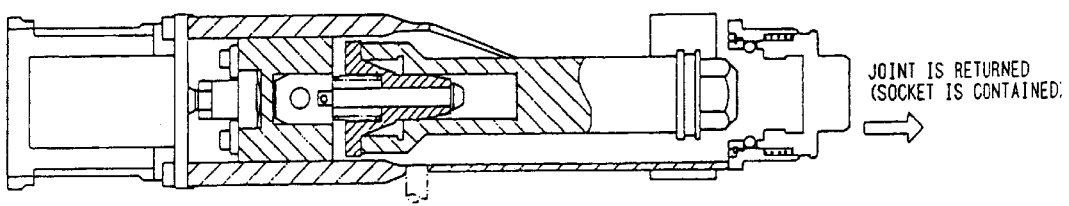

FIG. 33 is a perspective view of an example of an arrangement of work tools on a base according to the present embodiment, and FIG. 34 is a side view showing a driving portion. A description will be made on case wherein work tools 176 and 177 are supplied. A stand 181 of the work tool 176 has a configuration which is compliant to the configuration of the work tool 176 and is adapted such that its position is determined when the work tool 176 is leaned on the stand 181. A stand 182 for the work tool 177 has a structure such that its position is determined when the work tool 7 is inserted into it. The stands 181 and 182 are secured in predetermined positions on an intermediate base 172.

According to the present embodiment, since the base as a whole makes a rotary motion, three intermediate bases having the same configurations are positioned on a general purpose base 171 with positioning pins 175 at equal angles and are easily fixed by hinges or plunger mechanisms. Further, the general purpose base 171 is positioned on a driving portion 178 by a positioning hole 174 provided on the base and a positioning pin 179 provided on the driving portion 178 and is secured similarly to the intermediate bases. The general purpose base 171, the intermediate bases 172 and the stands 181, 182 placed on the driving portion 178 are put in a rotary motion and stopped at equal angles by the driving portion 178.

Two instructions are given to the robot on the work tools 176 and 177 on a pair of intermediate bases 172, and tools on another pair of intermediate bases 172 can be removed according to the first pair of instructions only by rotating the driving portion at a predefined angle. A schematic view of a first embodiment of an earth interlock device according to the invention is shown.

While the present embodiment employs a driving portion based on a rotary motion, it can be carried out based on a linear motion by arranging the intermediate bases at equal intervals and allowing them to move predefined distances.

An embodiment of a socket changing device will now be described.

FIG. 35 is a side sectional view showing the removal of a socket, and FIG. 36 is a side sectional view showing the retraction of the socket.

The present embodiment is a socket changing device for automatic changing of a socket 192 using a robot with which the socket can be attached to and detached from the main body of a tool by pushing a predefined portion of an attaching/detaching portion 191 in an axial direction during the attachment and detachment between a screwing tool mounted on the end of a robot and a socket 192. It comprises a base 193 for urging the attaching/detaching portion 191 at the end of a tool, a nut 194 having a configuration to engage with a polygonal hole of the socket 192, a shaft 195 engaged with the nut 194 so as to allow the same to rotate and a cylinder 196 coupled to the shaft 195 for forcing the nut 194 and shaft 195 to move to a predefined attaching/detaching position.

In this socket changing device, the base 193 has a U-shaped configuration in which an upper part 200 is wider to allow approach from sides of the base 193. Further, a sensor 197 incorporated in the cylinder detects whether the removal and containment of a socket have been normally performed.

A description will now be made with reference to FIG. 35 on a case of the removal of a socket.

As shown in FIG. 35(*a*), a socket 192 is initially set in the nut 194, and the rod of the cylinder 196 is pushed out.

The robot approaches the socket changing device according to an instruction to urge the attaching/detaching portion 191 against the base 193 up to a position where the socket 192 can be attached and detached as shown in FIG. 35(*b*). If a hole of the attaching/detaching portion 191 and the rear of the socket 192 do not properly engage at this time, the cylinder 196 which pushes the shaft 195 is pushed by the force of the robot, which causes the socket 192 set in the nut 194 to escape.

When the tool is then slowly rotated, as shown in FIG. 35(*b*), the attaching/detaching portion 191 and the socket 192 engage with each other. When they engage with each other, since the rod of the cylinder 196 tends to return to the initial state, the socket 192 moves to a position where it reaches the tool.

When the removal of the socket 192 is normally carried out, as shown in FIG. 35(*c*), the socket 192 moves to a predefined position. As a result, the position of the cylinder rod pushing the socket 192 is also determined. Therefore, by providing a limit switch sensor 197 at this position of the cylinder rod, the rotation of the tool can be stopped to remove the socket 192 by detecting the signal from the sensor 197.

A description will now be made with reference to FIG. 36 on the retraction of the socket 192.

First, a cylinder rod 196*a* is pushed out as shown in FIGS. 36(*a*) and (*b*).

The robot approaches the socket changing device according to an instruction and urges the attaching/detaching portion 191 against the base 193 up to a position where the socket 192 comes off as shown in the figure. If the socket 192 and the nut 194 do not engage with each other properly at this time, the cylinder rod 196*a* supporting the shaft 195 is pushed to cause the shaft 195 to escape.

Next, when the tool is slowly rotated, the socket 192 is engaged with the nut 194 by a returning force of the cylinder 196 if the socket 192 and nut 194 has not been properly engaged with each other. When the cylinder 196 is retracted, as shown in FIG. 36(*c*), the socket 192 is removed from the attaching/detaching portion 191 following the nut 194.

Finally, the attaching/detaching portion 191 is retracted as shown in FIG. 36(*d*) to terminate the retraction of the socket.

Whether the socket 192 has come off or not is detected by providing a sensor 197 on a side of the base 193 as in the case of removal to detect the fact that the socket 192 and the rod of the cylinder 196 have come to predefined positions.

According to the present embodiment, the nut 194 and shaft 195 can be removed by pulling out the pin 198 on a side of the base 193. By replacing the nut 194 and shaft 195 depending on the size of sockets, sockets having different bolt sizes and lengths can be accommodated.

As described above, the present embodiment allows a robot to reliably replace a socket at the end of a screwing tool by itself and, as a result, it allows a robot system in which an operator can not directly replace a socket such as a ground-operated robot for working on distribution wires to perform operations using screws in various sizes. Since the present embodiment can accommodate sockets in different sizes and lengths, there is no need for preparing screwing tools in all sizes required for the operation of a robot and preparing a space to store them. Only one screwing tool and space for storing is required and, if the socket changing device is prepared in the maximum quantity required for the operations of a robot, other operations can be handled only by replacing the components of the socket changing devices. Thus, it is possible to save the space and cost.

A description will now be made on a method for controlling the alignment of position and orientation according to the present invention.

Figure 37:
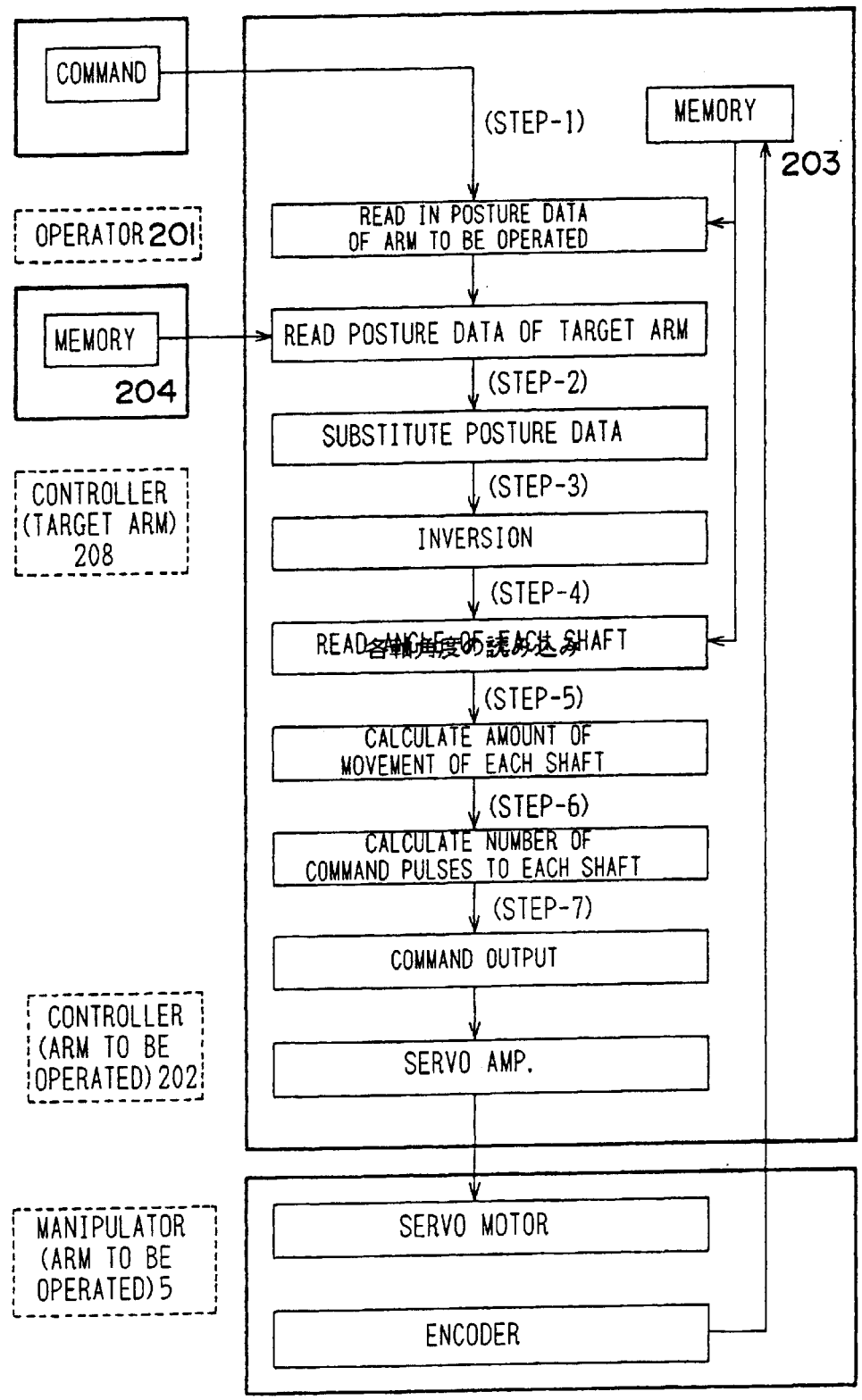
FIG. 37 is a configuration diagram and a flow chart showing a method for controlling the alignment of a position and orientation according to the present invention.
Figure 38:
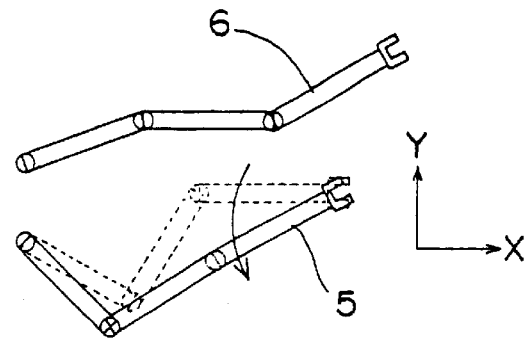
FIGS. 38(*a*)–(*d*) illustrate an embodiment of the alignment of a position and orientation.
Figure 38:
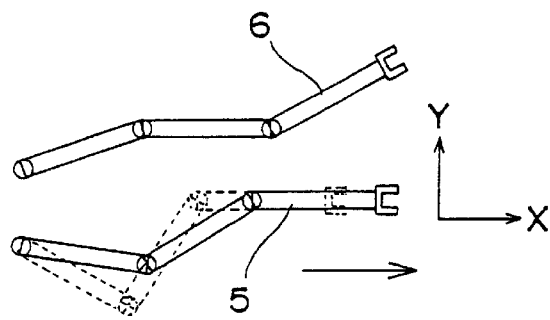
Figure 38:
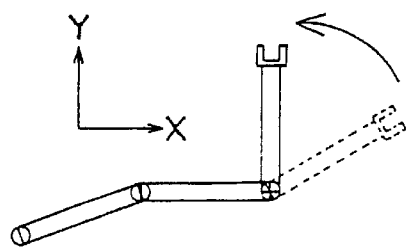
Figure 38:
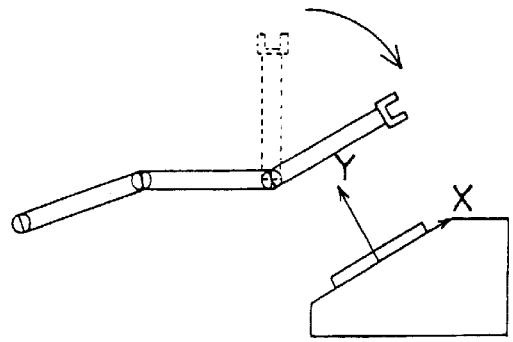

FIG. 37 shows a system configuration and a flow chart for the present embodiment, and FIG. 38 shows an embodiment of each of position alignment and posture alignment. In FIG. 37, 201 represents an operator; 202 represents a controller of a shaft to be worked 5; 203 represents a memory; and 204 represents a memory of a target arm 6.

Referring to the embodiments shown in FIG. 38, FIG. 38(*a*) shows alignment of posture with the target arm 6 in a two-armed manipulator 5. Similarly, positional alignment with the target arm 6 of the two-armed manipulator can be carried out (FIG. 38(*b*)). When the operator selects three items (position, target arm and X as a coordinate axis of interest), the robot controller substitutes an X-component value of the position of the target arm read from the memory in a matrix showing a control point and carries out calculations and commanding to operate the manipulator.

A second embodiment of the present invention is the alignment of posture relative to a basic frame (FIG. 38(*c*)). When the operator selects three items (posture, basic frame and Y as the direction of the coordinate axis of interest), the robot controller substitutes a value stored in the memory in advance in a matrix showing the posture of a control point and carries out calculations and commanding to operate the manipulator.

A third embodiment of the present invention is the alignment of posture relative to an object to be worked (work) (FIG. 38(*d*)). When the operator selects three items (posture, frame of an object to be worked and X as the direction of the coordinate axis of interest), the robot controller substitutes a value stored in the memory in advance in a matrix showing the posture of a control point and carries out calculations and commanding to operate the manipulator.

Since the present embodiment uses an element of the matrix of a known frame in the calculations to operate the manipulator, the position alignment and posture alignment with the known frame can be automated to improve both of the operating time and operability.

A description will now be made on a method for calibrating the posture of a robot.

Figure 39:
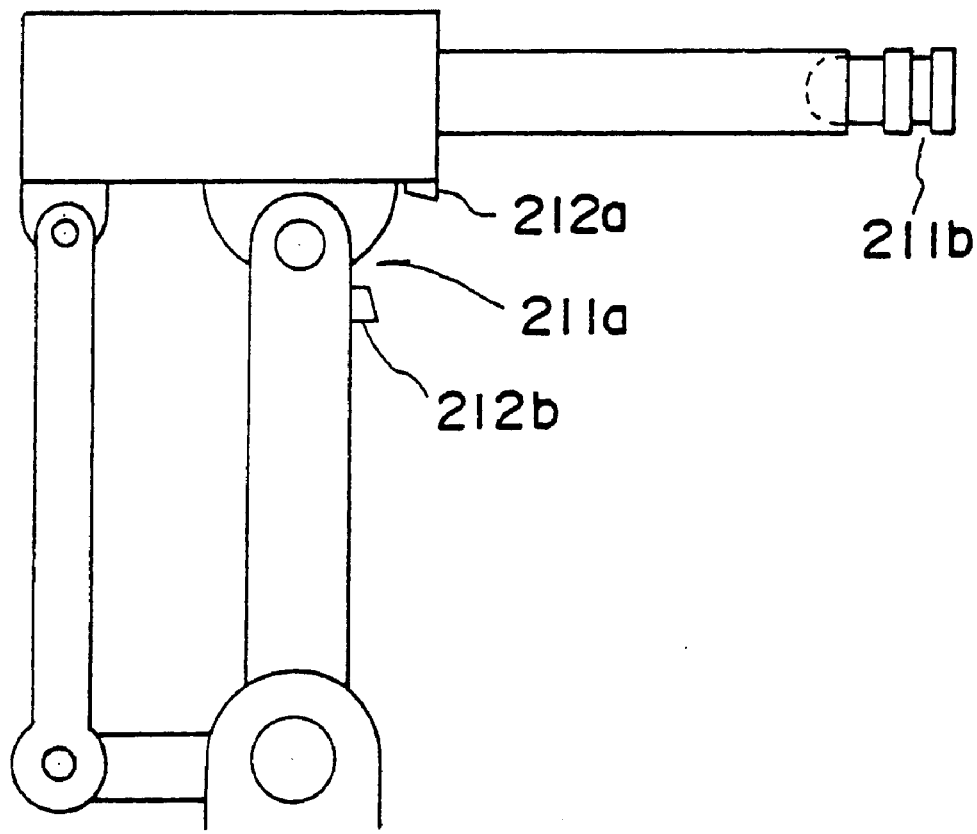
FIG. 39 is a schematic view showing an embodiment of a method for calibrating the posture of a robot.

FIG. 39 shows an embodiment in which 211*a*, 211*b* represents shafts, and stoppers 212*a*, 212*b* are respectively provided on frames on both sides of the shaft 211*a*. Referring to the shaft 211*a* as an example, an output value A of a position detector provided on the motor for the shaft 211*a* at a basic position of the shaft 211*a* is read when accurate calibration has been carried out to determine the basic position of the robot, and the shaft is moved until the stopper 212*a* hits the stopper 212*b*. The stoppers may be manually caused to hit each other with the brake of the motor released to adjust the force with which the stoppers hit, thereby eliminating the possibility of damage. An output value B from the position detector at that time is read and is subtracted from a value which has been previously read. The resultant value C (=B−A) represents the output value of the position detector from the basic position to the position where the stopper is hit. When it becomes necessary to configure the posture of the robot as a result of positional shifts or parts replacement thereafter, the shaft is moved from the output value of the position detector at the position where the stoppers 212*a* and 212*b* hit each other by the value C, and the position thus reached is used as the basic position. Further, for a shaft on which the stoppers can not be mounted, e.g., an endless rotating shaft 211*b*, the stoppers may be mounted during calibration to allow calibration in the same way as described above. In order to allow the configuration according to the above-described method even when part replacement involving a change in the positional relationship between the stoppers is carried out, positional accuracy is controlled by means including the provision of locating pins on the stoppers.

Industrial Applicability

The present invention can be used in fields where live transmission and distribution wires are to be worked.

What is claimed is:

1. A robot vehicle for working on live transmission and distribution wires or for hot-line jobs comprising an insulated boom constituted by an insulator which is on the end stage of a multi-stage boom rotatably, elevatably and extendably supported at the base thereof on a vehicle for high-place work, two manipulators having a multi-shaft configuration for effecting wiring operations, sliding devices for sliding back and forth said manipulators independently left and right, a suspender arm in a multi-shaft configuration having a function of suspending a heavy object to be supported on an electric wire to allow remote operations by an operator, said manipulators, sliding devices and suspender arm being driven by actuators, characterized in that:

the actuators for driving said manipulators and said sliding devices being electrically powered, and the actuators for elevating and lowering the suspender arm being hydraulically powered.

2. A robot vehicle for hot-line jobs according to claim 1, wherein an actuator for driving said suspender arm for pivoting is powered electrically.

3. A robot vehicle for hot-line jobs according to claim 1, wherein an umbrella having a gutter to collect rain is mounted on an end of said insulated boom.

4. A robot vehicle for hot-line job according to claim 1, wherein an air gap of 60 mm or more is maintained between an inner wall of an insulated protective cover covering an exposed metal portion of the manipulators and actuators and a conductive portion for a robot vehicle for working on a hot lines which handles distribution wires in a 20 kV class.

5. A robot vehicle for hot-line jobs according to claim 1, characterized in that it comprises robot controllers for controlling said two manipulators and generators for supplying power to the robot controllers each provided independently to prevent phase shorting accidents which occur when the two manipulators may touch hot lines in different phases simultaneously and in that the robot controllers and said generators are secured to said base constituted by an insulator and signals are transmitted and received between the two separate robot controllers using an optical cable to provide electrical insulation between the two manipulators.

6. A robot vehicle for hot-line jobs according to claim 1, comprising an earth interlock device which has two conductors provided with connection fittings connectable and securable to a grounding wire on the end thereof and insulated from each other, one or two probes for containing said two conductors having a structure in which said two connecting fittings are insulated from each other, a coil magnetized when said two connecting fittings are connected to the grounding wire, an electromagnetic contactor having a contact capable of enabling operational circuits of electronic devices when said coil is magnetized and a battery for supplying power to said electromagnetic contactor and in which said connection fittings, electromagnetic contactor and battery are connected in series to one of said conductor.

7. A robot vehicle for hot-line jobs according to claim 1, wherein said two sliding devices are mounted in an arrangement such that the interval spacing from each other is increased toward an end travel.

8. A robot vehicle for hot-line jobs according to claim 1, comprising an automatic tool changer for automatically changing tools required for the operation of said two-armed manipulators provided on said base, wherein the automatic tool changer comprises:

a tool attaching and detaching portion having a key for positioning a tool in a key groove on a manipulator and a clamp button for securing a tool operable in a radial direction and having a restoring force in the direction of moving away from a center axis;

a rack portion having a cylinder for pressing said clamp button when a tool is attached and detached; and a pneumatic pressure circuit capable of varying the thrust force of said cylinder.

9. A robot vehicle for hot-line jobs according to claim 1, wherein said base comprises a work tool supplying device comprising:

a stand for positioning and holding each work tool;

an intermediate base on which said stand is disposed as required in advance depending on the work;

a general-purpose base common to all kinds of work on and from which a plurality of intermediate bases can be positioned and removed at equal angles or equal intervals: and a driving portion to and from which both of said intermediate base and general-purpose base can be attached and detached for driving said general-purpose base for angular indexing.

10. A robot vehicle for hot-line job according to claim 1, comprising a socket changing device which is a tool for fastening and loosening of a bolt or the like performed by said manipulators, for pushing a predefined part of a attaching/detaching portion when the tool and a socket are attached together or detached in an axial direction to allow the robot to replace a socket attachable to and detachable from the main body of the tool automatically, wherein the socket changing device comprises:

a cylindrical base for pushing said attaching/detaching portion;

a nut engaging with a polygonal hole of said socket; and a shaft into which the nut is screwed and which is supported in the base with a spring to be slidable in an axial direction.

11. A robot vehicle for hot-line jobs according to claim 1, comprising a socket changing device which is a tool for fastening and loosening of a bolt or the like performed by said two-armed manipulators, for pushing a predefined part of a attaching/detaching portion when the tool and a socket are attached together or detached in an axial direction to allow the robot to change a socket attachable to and detachable from the main body of the tool automatically, wherein the socket changing device comprises:

a base for urging the attaching/detaching portion at the end of the tool;

a nut having a configuration to engage with a polygonal hole of said socket;

a shaft engaged with the nut so as to allow the same to rotate; and a cylinder coupled to said shaft to force said nut and shaft to move to a predefined attaching/detaching position.

12. A robot vehicle for hot-line jobs according to claim 1, wherein the actuator for driving said suspender arm for pivoting is powered hydraulically.

* * * * *